(12) United States Patent
Yamamoto

(10) Patent No.: US 10,903,557 B2
(45) Date of Patent: Jan. 26, 2021

(54) ANTENNA DEVICE AND ELECTRONIC DEVICE

(71) Applicant: Murata Manufacturing Co., Ltd., Nagaokakyo (JP)

(72) Inventor: Masayoshi Yamamoto, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 7 days.

(21) Appl. No.: 16/551,773

(22) Filed: Aug. 27, 2019

(65) Prior Publication Data

US 2019/0386388 A1   Dec. 19, 2019

Related U.S. Application Data

(63) Continuation of application No. PCT/JP2019/004895, filed on Feb. 12, 2019.

(30) Foreign Application Priority Data

Feb. 13, 2018 (JP) ................................ 2018-023545

(51) Int. Cl.
  *H01Q 1/36* (2006.01)
  *H01Q 7/06* (2006.01)
  *H01Q 1/22* (2006.01)

(52) U.S. Cl.
  CPC ............. *H01Q 1/36* (2013.01); *H01Q 1/2283* (2013.01); *H01Q 7/06* (2013.01)

(58) Field of Classification Search
  CPC .......... H01Q 1/2283; H01Q 1/22; H01Q 1/36; H01Q 7/06
  See application file for complete search history.

(56) References Cited

U.S. PATENT DOCUMENTS 9,166,291 B2 * 10/2015 Kato ........................ H01Q 1/38
9,190,711 B2 * 11/2015 Yamaguchi .......... H01Q 1/2216
(Continued)

FOREIGN PATENT DOCUMENTS

JP   09-139622 A   5/1997
JP   09-148838 A   6/1997
(Continued)

OTHER PUBLICATIONS

Official Communication issued in International Patent Application No. PCT/JP2019/004895, dated Mar. 26, 2019.

*Primary Examiner* — Tho G Phan
(74) *Attorney, Agent, or Firm* — Keating & Bennett, LLP

(57) ABSTRACT

In an antenna device, a first coil conductor portion of a coil conductor faces a planar conductor to at least partially overlap with the planar conductor when viewed in a plan view. A second coil conductor portion of the coil conductor does not overlap with the planar conductor when the planar conductor is viewed in the plan view. On a straight line passing a center of gravity of a coil opening of the coil conductor when the planar conductor is viewed in the plan view, a first distance between the first coil conductor portion and a first edge is shorter than a second distance between the first coil conductor portion and a second edge. The second distance is shorter than a third distance between the center of gravity of the coil opening and a second edge on the straight line passing the center of gravity of the coil opening.

20 Claims, 19 Drawing Sheets

(56) References Cited

U.S. PATENT DOCUMENTS

| | | | | |
|---|---|---|---|---|
| 9,219,301 | B2* | 12/2015 | Kubo | H01Q 1/38 |
| 9,490,537 | B2* | 11/2016 | Ito | H01Q 7/00 |
| 9,543,655 | B2* | 1/2017 | Lee | H01Q 7/06 |
| 10,164,336 | B2* | 12/2018 | Nakano | H01Q 1/242 |
| 2012/0091821 | A1 | 4/2012 | Kato et al. | |
| 2013/0127573 | A1 | 5/2013 | Nakano et al. | |
| 2019/0252781 | A1* | 8/2019 | Isayama | H01F 17/0013 |
| 2019/0386389 | A1* | 12/2019 | Ichikawa | H02J 50/402 |

FOREIGN PATENT DOCUMENTS

| | | |
|---|---|---|
| JP | 2001-351083 A | 12/2001 |
| JP | 2013-168756 A | 8/2013 |
| JP | 2014-022909 A | 2/2014 |
| WO | 2010/122685 A1 | 10/2010 |
| WO | 2011/158844 A1 | 12/2011 |

* cited by examiner

ANTENNA DEVICE AND ELECTRONIC DEVICE

CROSS REFERENCE TO RELATED APPLICATIONS

This application claims the benefit of priority to Japanese Patent Application No. 2018-023545 filed on Feb. 13, 2018 and is a Continuation Application of PCT Application No. PCT/JP2019/004895 filed on Feb. 12, 2019. The entire contents of each application are hereby incorporated herein by reference.

BACKGROUND OF THE INVENTION

1. Field of the Invention

The present invention generally relates to an antenna device and an electronic device, and more particularly, to an antenna device including a coil conductor and a planar conductor, and an electronic device including the antenna device.

2. Description of the Related Art

An antenna device including a coil conductor and a planar conductor is known (refer to, for example, International Publication No. 2010/122685).

The antenna device described in International Publication No. 2010/122685 includes a coil conductor coiled around an opening of a conductor layer.

To install the antenna device described in International Publication No. 2010/122685 in an electronic device requiring size reduction, the size of the conductor layer needs to be reduced. The size reduction of the conductor layer involves size reduction of the opening of the conductor layer, and size reduction of the opening of the coil conductor, which prevents favorable communication characteristics of the antenna device from being fulfilled. An antenna device including only a coil conductor without a conductor layer would also fail to fulfill favorable communication characteristics.

SUMMARY OF THE INVENTION

Preferred embodiments of the present invention provide antenna devices that each have favorable communication characteristics while having a small size, and electronic devices including the antenna devices.

An antenna device according to preferred embodiments of the present invention includes a coil conductor and a planar conductor. The coil conductor has a spiral shape and a coil opening. The planar conductor includes a first edge and a second edge. When the planar conductor is viewed in a plan, the first edge is located on an outer side of an outermost turn of the coil conductor, and the second edge is located in the coil opening. The coil conductor includes a first coil conductor portion and a second coil conductor portion. The first coil conductor portion faces the planar conductor to at least partially overlap with the planar conductor when the planar conductor is viewed in a plan view. The second coil conductor portion does not overlap with the planar conductor when the planar conductor is viewed in a plan view. When the planar conductor is viewed in a plan view, on a straight line passing through a center of gravity of the coil opening, a first distance between the first coil conductor portion and the first edge is shorter than a second distance between the first coil conductor portion and the second edge. On the straight line passing through the center of gravity of the coil opening, the second distance is shorter than a third distance between the center of gravity of the coil opening and the second edge.

An electronic device according to a preferred embodiment of the present invention includes the antenna device and a controller. The controller controls the antenna device.

The antenna device and the electronic device according to the above preferred embodiments of the present invention have favorable communication characteristics while having a small size.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
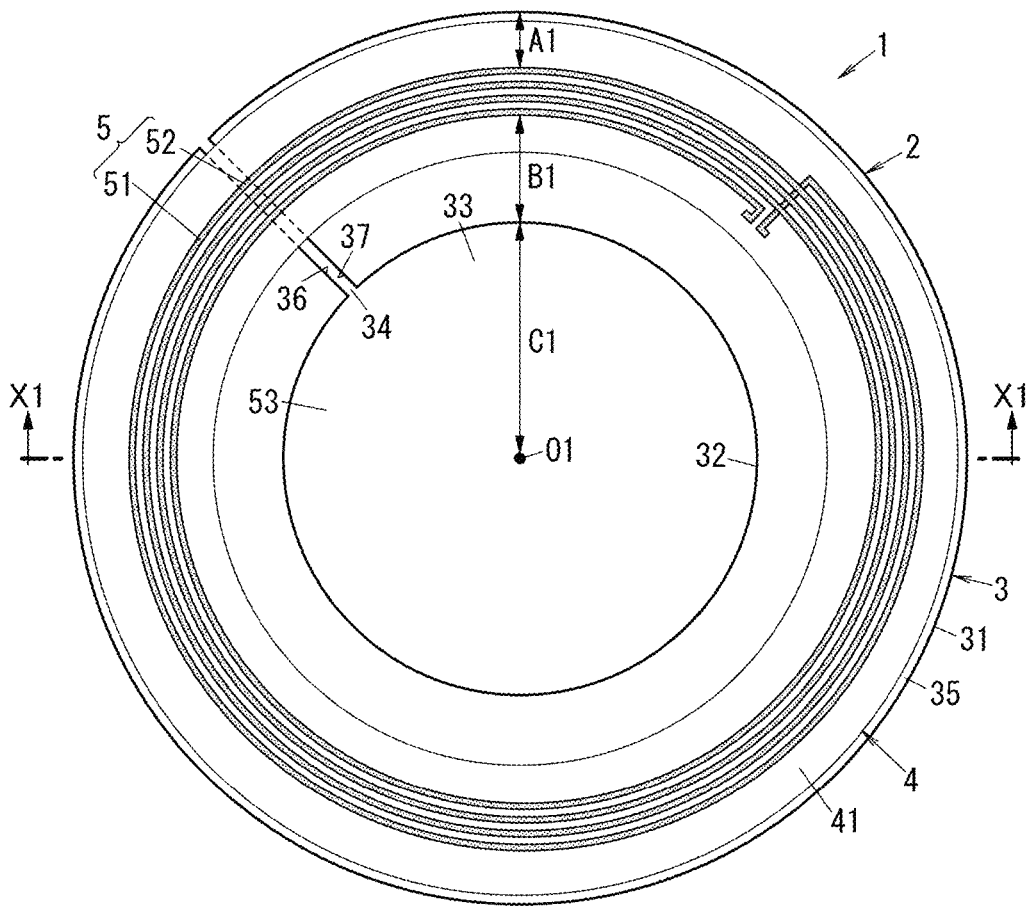
FIG. 1A is a front view of an antenna device according to Preferred Embodiment 1 of the present invention.

Antenna devices and electronic devices according to Preferred Embodiments 1 to 6 will be described below with reference to the drawings. Throughout the description and the drawings, components are described by way of examples in terms of the size, thickness, and dimensional relationships between the components. These components are not limited to those described in the description and the drawings by way of example.

An "antenna device" according to each of the preferred embodiments is preferably an antenna device for a "radio transmission system". Here, the expression "radio transmission system" refers to a system that performs radio transmission with a communication partner (an antenna of an external device) due to magnetic field coupling. The expression "transmission" refers to both signal transmission/reception and power transfer/reception. The expression "radio transmission system" refers to both a short-distance radio communication system and a wireless power supply system. For radio transmission with magnetic field coupling, the antenna device includes a current path having a length, that is, a coil conductor having a line length, described later, that is far smaller than the wave length λ at the used frequency, specifically, preferably smaller than or equal to about λ/10. Thus, in the used frequency band, the electromagnetic wave has low radiation efficiency. Here, the wave length λ is an effective wave length considering the wave length reduction effect by the dielectric property and the magnetic permeability of a base on which the coil conductor is disposed. Both ends of the coil conductor are connected to a feeder circuit to allow uniform or substantially uniform current to flow through the current path of the antenna device, that is, through the coil conductor.

Examples of short-distance radio communication used as the "antenna device" according to each preferred embodiment include, for example, near-field communication (NFC). The frequency band used for short-distance radio communication is, for example, a HF band, particularly, the frequency band on or around 13.56 MHz.

Examples of a wireless power supply technology for the "antenna device" according to preferred embodiments of the present invention include magnetic field coupling such as, for example, electromagnetic induction and magnetic field resonance. Examples of a wireless power supply standard for electromagnetic induction include "Qi (registered trademark)" developed by Wireless Power Consortium (WPC). The frequency band used for electromagnetic induction preferably falls within, for example, a frequency band within and around the range of about 110 kHz to about 205 kHz. Examples of a wireless power supply standard for magnetic field resonance include "AirFuel Resonant" developed by AirFuel (registered trademark) Alliance. The frequency band used for magnetic field resonance preferably falls within, for example, a frequency band of about 6.78 MHz or about 100 kHz.

Preferred Embodiment 1

First, the entire configuration of an antenna device 1 according to a Preferred Embodiment 1 will be described with reference to the drawings.

Figure 1B:
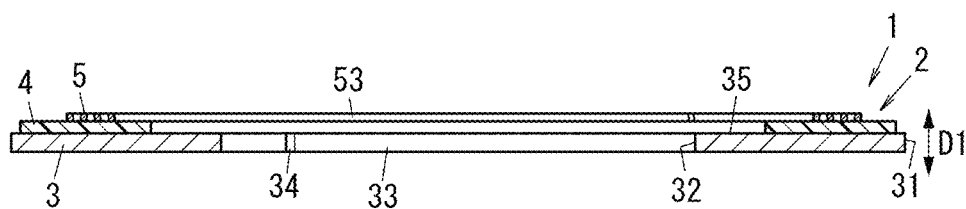
FIG. 1B is a cross-sectional view of the antenna device taken along line X1-X1 in FIG. 1A.
Figure 2:
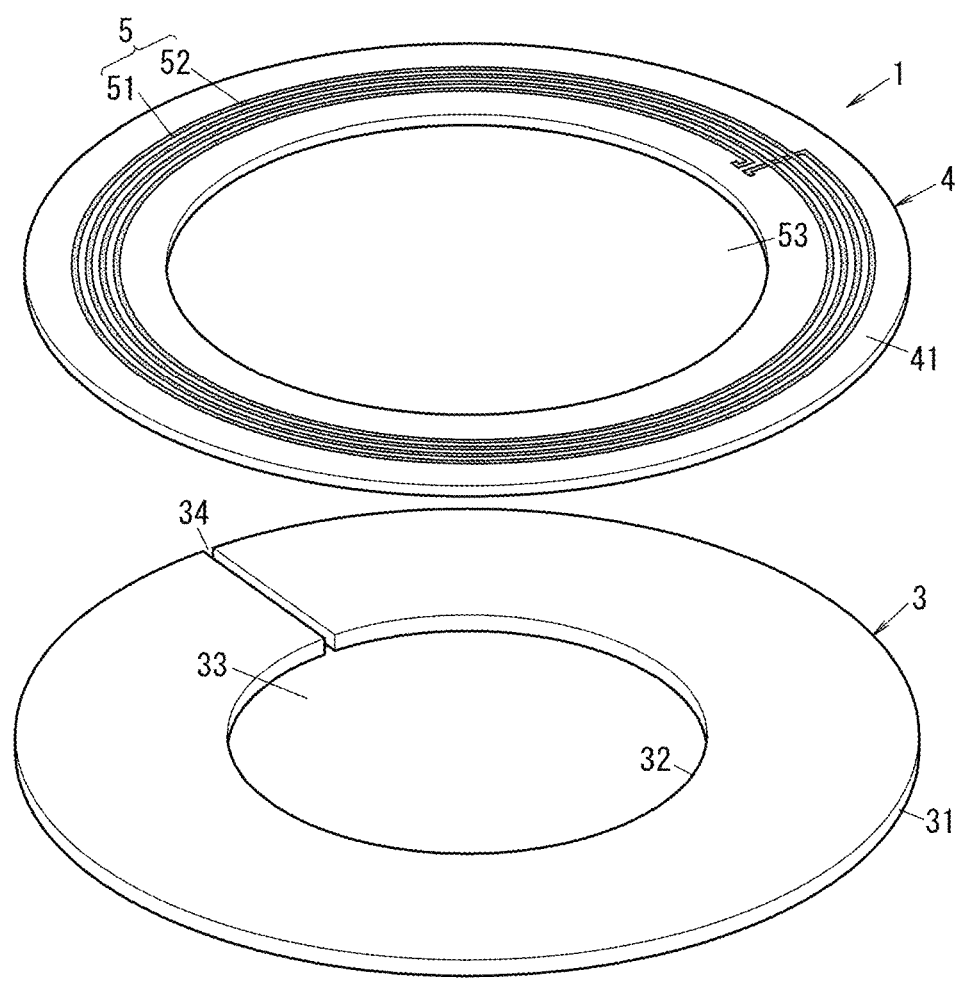
FIG. 2 is an exploded perspective view of the antenna device.

With reference to FIGS. 1A, 1B, and FIG. 2, the antenna device 1 according to the Preferred Embodiment 1 includes an antenna element 2 and a planar conductor 3. The antenna element 2 preferably includes a base 4 and a coil conductor 5.

Figure 6:
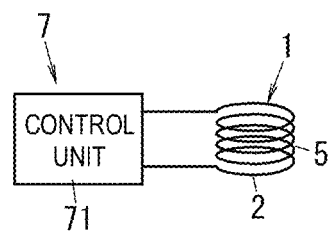
FIG. 6 is a schematic diagram of an electronic device according to a Preferred Embodiment 1 of the present invention.

As illustrated in FIG. 6, the antenna device 1 is preferably installed in an electronic device 7 to perform radio communication with an antenna device of an external device, not illustrated.

The electronic device 7 including the antenna device 1 is preferably, for example, a mobile phone including a smartphone, a wearable device, a wristwatch terminal, a headphone, or a hearing aid. In addition to the antenna device 1, the electronic device 7 includes a controller 71. The controller 71 controls the antenna device 1.

Components of the antenna device 1 according to the Preferred Embodiment 1 will now be described with reference to the drawings.

As illustrated in FIGS. 1A, 1B, and FIG. 2, the planar conductor 3 is defined by a disk made of, for example, metal. The planar conductor 3 is preferably made of, for example, aluminum, stainless steel, or copper. When the antenna device 1 is installed in the electronic device 7, the planar conductor 3 is preferably, for example, a metal case of a secondary cell.

The planar conductor 3 includes a main surface 35, and is disposed with the main surface 35 facing the antenna element 2 in a first direction D1. In other words, the planar conductor 3 is preferably disposed to at least partially overlap with the antenna element 2 when the main surface 35 of the planar conductor 3 is viewed in a plan. More specifically, the main surface 35 is preferably an annular flat surface. Here, the first direction D1 is a direction in which the main surface 35 of the planar conductor 3 is viewed in a plan view, a direction orthogonal or substantially orthogonal to the main surface 35 of the planar conductor 3, or a thickness direction of the planar conductor 3. Herein, the expression "when the planar conductor is viewed in a plan view" refers to "when the main surface of the planar conductor is viewed in a plan view".

The planar conductor 3 includes a first edge 31 and a second edge 32, across from each other. As described above, the planar conductor 3 according to the Preferred Embodiment 1 preferably has an annular plate shape. Thus, the first edge 31 is an outer circumferential edge, and the second edge 32 is an inner circumferential edge. In the description, an "edge of the planar conductor" corresponds to a boundary between an area in which the planar conductor is provided and an area in which the planar conductor is not provided.

In the planar conductor 3, the scale ratio of the dimension in the planar direction orthogonal or substantially orthogonal to the first direction D1 to the dimension in the first direction D1 is greater than 1. Specifically, the planar conductor 3 is a planar conductor having a dimension in the planar direction longer than the dimension in the first direction D1. The planar direction is a collective expression of the direction orthogonal or substantially orthogonal to the first direction D1. In other words, the planar direction is a direction along the main surface 35 of the planar conductor 3.

The planar conductor 3 according to the Preferred Embodiment 1 preferably includes a conductor opening 33 and a slit 34. When the planar conductor 3 is viewed in a plan view, a coil opening 53 at least partially overlaps with the conductor opening 33. The slit 34 is continuous with the conductor opening 33. The planar conductor 3 includes a third edge 36 and a fourth edge 37, which connect the first edge 31 and the second edge 32 to each other. The third edge 36 and the fourth edge 37 face each other in the circumferential direction. The slit 34 is provided between the third edge 36 and the fourth edge 37. When the planar conductor 3 is viewed in a plan view, the conductor opening 33 has an area smaller than the area of the coil opening 53.

In the planar conductor 3, the main surface 35 facing the antenna element 2 is not limited to a completely flat surface. Here, the main surface 35 is regarded as a flat surface even having projections and depressions smaller than the dimension of the planar conductor 3 in the first direction D1 (thickness of the planar conductor 3) or the dimension in the planar direction. The main surface 35 may not be an entirely flat surface. In other words, the main surface 35 may be a surface that is at least partially flat.

As shown in FIGS. 1A, 1B, and FIG. 2, the antenna element 2 is annular, and preferably includes the base 4 and the coil conductor (coil antenna) 5. Although not illustrated, the antenna element 2 also includes a protective layer. The antenna element 2 is adjacent to (close to) the planar conductor 3 in the first direction D1. The antenna element 2 may be in close contact with the planar conductor 3 or may be spaced apart from the planar conductor 3 with a gap therebetween.

The base 4 is preferably defined as a plate or sheet of an electrical insulating material such as resin, for example. The base 4 includes a main surface 41. The base 4 is annular when viewed in a plan in the first direction D1. Examples of an electrical insulating material used for the base 4 include polyimide, polyethylene terephthalate (PET), and a liquid crystal polymer (LCP).

The coil conductor 5 is annular when viewed in a plan view in the first direction D1, and includes a coil opening 53. The coil opening 53 is circular, and extends through in the first direction D1. The coil conductor 5 is disposed on the main surface 41 of the base 4. Preferably, the base 4 has a size large enough to allow the coil conductor 5 to be disposed thereon.

The coil conductor 5 is a thin line conductor and disposed in a spiral shape wound around a first axis along the first direction D1. More specifically, the coil conductor 5 is coiled in several turns around the first axis when viewed in a plan in the first axis direction (first direction D1). For example, the coil conductor 5 is preferably coiled in four turns. The coil conductor 5 is preferably made of copper or aluminum, for example. For example, the coil conductor 5 is disposed on the main surface 41 of the base 4 by disposing a copper film or aluminum film on the main surface 41 of the base 4 by etching or printing.

Here, the expression that the coil conductor 5 is "coiled in N turns" refers to, not only the case where a line conductor is actually coiled in N turns, but also the case where the coil conductor 5 is patterned into a shape of a line conductor coiled in N turns.

The coil conductor 5 disposed in a spiral shape may be a two-dimensional coil antenna coiled in several turns into a spiral around a coiling axis on one flat surface. Alternatively, the coil conductor 5 disposed in a spiral shape may be a three-dimensional coil antenna coiled in several turns into a helix along and around a coiling axis. FIG. 1A, FIG. 1B, and FIG. 2 illustrate a two-dimensional coil antenna.

The coil conductor 5 includes a first coil conductor portion 51 and a second coil conductor portion 52. The first coil conductor portion 51 faces the planar conductor 3 to at least partially overlap with the planar conductor 3 when the planar conductor 3 is viewed in a plan. The second coil conductor portion 52 does not overlap with the planar conductor 3 when the planar conductor 3 is viewed in a plan. Specifically, the second coil conductor portion 52 according to the Preferred Embodiment 1 faces the slit 34 of the planar conductor 3 when the planar conductor 3 is viewed in a plan.

The coil conductor 5 preferably has a uniform conductor line width throughout between the innermost turn and the outermost turn of the coil conductor 5. When the coil conductor 5 has a shape coiled in a spiral shape around the first axis, the conductor line width of the coil conductor 5 refers to a dimension in the lateral direction orthogonal to the longitudinal direction of a line conductor constituting the coil conductor 5.

Here, the conductor line width may differ between the innermost turn and the outermost turn of the coil conductor 5. For example, when the conductor line width of the inner turn of the coil conductor 5 is smaller than the conductor line width of the outer turn of the coil conductor 5, the magnetic flux caused by the current of the inner turn of the coil conductor 5 is disposed further closer to the planar conductor 3. This structure can thus enhance the magnetic flux density of the coil opening 53.

As described above, when the planar conductor 3 is viewed in a plan, the planar conductor 3 faces the coil conductor 5. More specifically, when the planar conductor 3 is viewed in a plan, the planar conductor 3 faces the coil conductor 5 with the first edge 31 disposed on the outer side beyond the coil conductor 5 and the second edge 32 disposed in the coil opening 53 of the coil conductor 5.

As described above, the first coil conductor portion 51 of the coil conductor 5 faces the planar conductor 3 to at least partially overlap with the planar conductor 3 when the planar conductor 3 is viewed in a plan. The second coil conductor portion 52 does not overlap with the planar conductor 3 when the planar conductor 3 is viewed in a plan.

In the coil conductor 5 and the planar conductor 3, throughout the first coil conductor portion 51, on the straight line passing through a center of gravity O1 of the coil opening 53, a first distance A1 between the first coil conductor portion 51 and the first edge 31 of the planar conductor 3 is preferably shorter than a second distance B1 between the first coil conductor portion 51 and the second edge 32 of the planar conductor 3. Here, the first distance A1 is a distance between the outermost turn of the first coil conductor portion 51 and the first edge 31 of the planar conductor 3. The second distance B1 is a distance between the innermost turn of the first coil conductor portion 51 and the second edge 32 of the planar conductor 3.

On the straight line passing a portion of the second edge 32 of the planar conductor 3 at which the second distance B1 is shortest, the shortest distance of the second distance B1 is shorter than a third distance C1 between the center of gravity O1 of the coil opening 53 and the second edge 32 of the planar conductor 3. Here, the center of gravity O1 of the coil opening 53 overlaps with the center of mass of the coil opening 53 if the coil opening 53 would be an object having a uniform mass. Alternatively, the center of mass of the coil conductor 5 may be determined as the center of gravity O1 of the coil opening 53.

Figure 3A:
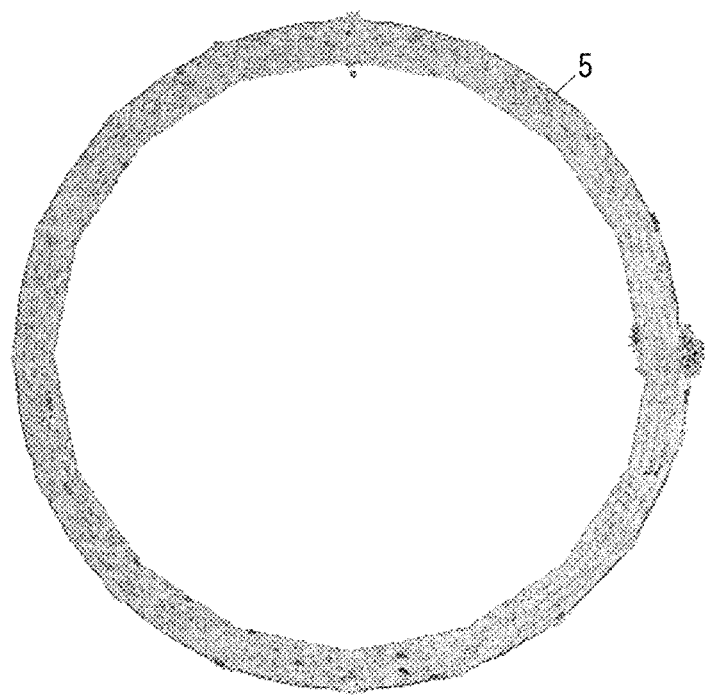
FIG. 3A is a distribution map of the current density of a coil conductor in the antenna device.
Figure 3B:
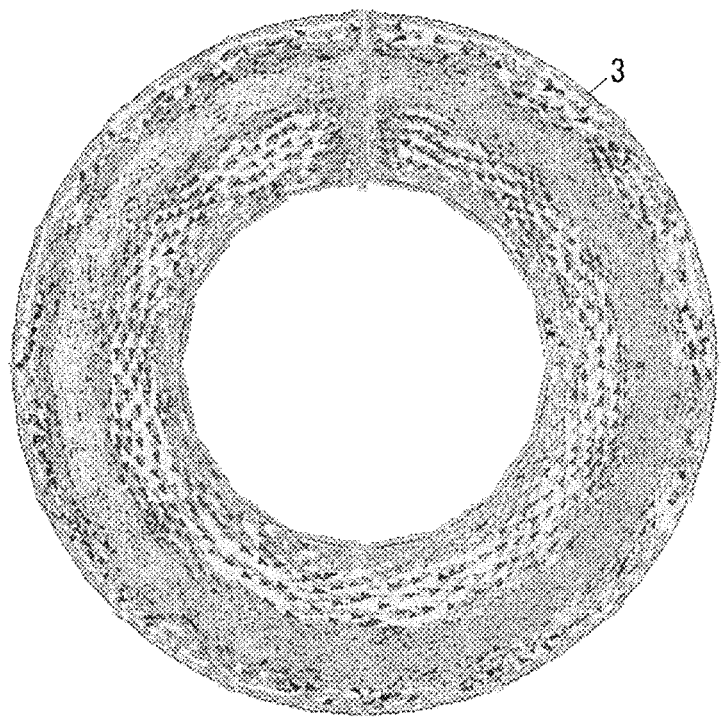
FIG. 3B is a distribution map of the current density of a planar conductor in the antenna device.

The operation of the antenna device 1 according to the Preferred Embodiment 1 will now be described with reference to FIGS. 3A, 3B, FIGS. 4A, 4B, and FIG. 5. FIG. 3A illustrates the current density of the coil conductor 5, and FIG. 3B illustrates the current density of the planar conductor 3. In FIGS. 3A and 3B, the area including a large number of arrows is an area having a high current density, whereas the area including a small number of arrows is an area having a low current density. Arrows in FIGS. 4A and 4B represent the directions of current.

Figure 4A:
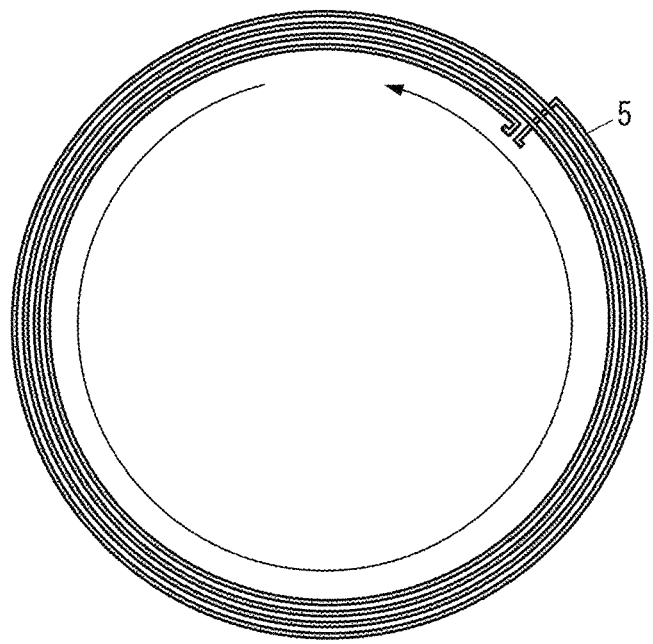
FIG. 4A is a schematic diagram of a current flow of the coil conductor in the antenna device.
Figure 4B:
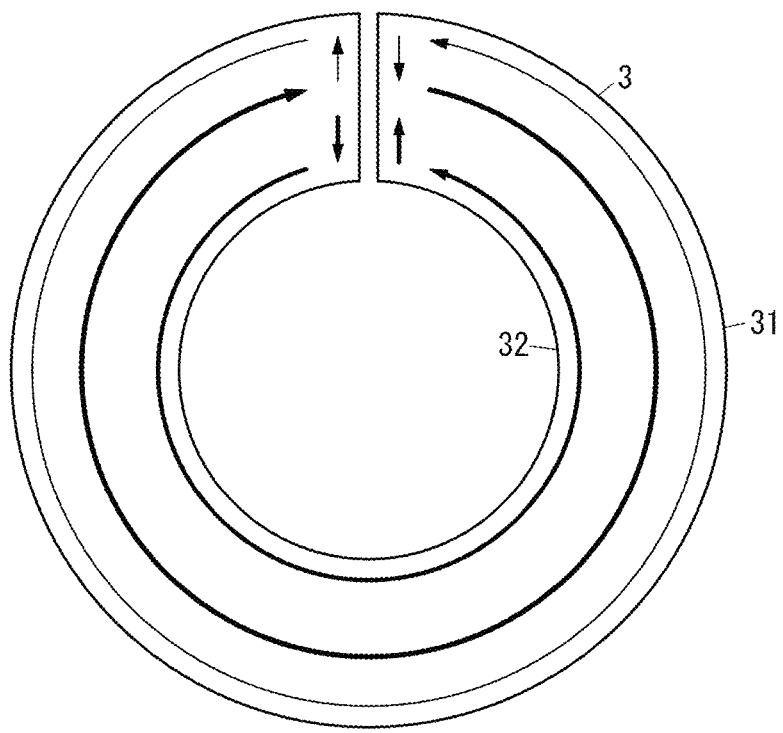
FIG. 4B is a schematic diagram of a current flow of the planar conductor in the antenna device.

As illustrated in FIG. 3A and FIG. 4A, when current flows through the coil conductor 5, an induced current flows through the planar conductor 3 due to magnetic field coupling, as illustrated in FIG. 3B and FIG. 4B. More specifically, when current flows through the coil conductor 5, as illustrated in FIG. 3B and FIG. 4B, an induced current flows through a portion of the planar conductor 3 that at least partially overlaps with the coil conductor 5 when the planar conductor 3 is viewed in a plan, in a direction opposite to the direction in which the current flows through the coil conductor 5.

Figure 5:
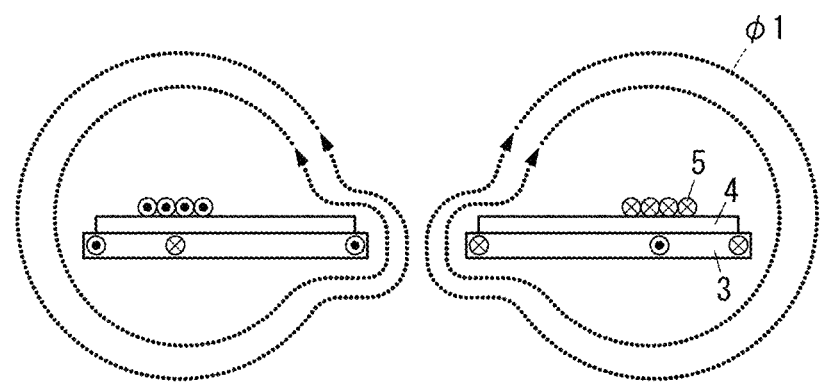
FIG. 5 is a schematic diagram of a magnetic flux of the antenna device.

The planar conductor 3 includes the slit 34. Thus, as illustrated in FIG. 3B and FIG. 4B, current flows through an outer circumferential portion (an area adjacent to the first edge 31) and the inner circumferential portion (an area adjacent to the second edge 32) of the planar conductor 3 that do not overlap with the coil conductor 5, in a direction the same as the direction in which current flows through the coil conductor 5. As illustrated in FIG. 5, current flowing through the outer circumferential portion and the inner circumferential portion of the planar conductor 3 causes a magnetic flux directed in the same direction as a magnetic flux $\phi 1$ caused by the current of the coil conductor 5.

In the planar conductor 3, the coil conductor 5 is located closer to the outer circumferential portion (the first edge 31) than the inner circumferential portion (the second edge 32). Thus, a larger amount of the magnetic flux $\phi 1$ caused by the current flowing through the coil conductor 5 passes around the inner circumferential portion (the area adjacent to the second edge 32) of the planar conductor 3 than around the outer circumferential portion (the area adjacent to the first edge 31) of the planar conductor 3. In other words, the magnetic flux $\phi 1$ is more likely to interlink itself with the inner circumferential portion of the planar conductor 3 than with the outer circumferential portion of the planar conductor 3. Thus, a larger amount of an induced current flows through the inner circumferential portion of the planar conductor 3 than the outer circumferential portion of the planar conductor 3.

Thus, the coil opening 53 has a higher magnetic flux density than the outer portion of the coil conductor 5, and the coil opening 53 enhances the magnetic flux density further with the induced current flowing through the inner circumferential portion of the planar conductor 3.

When an antenna device 1 includes a coil conductor 5 of a uniform size and a planar conductor 3 of a larger size, the antenna device 1 would fail to perform radio communication with a communication partner when being located close to the communication partner, because the frequency of the communication partner shifts to a high frequency. Thus, when being located close to a communication partner, the antenna device 1 including a small-sized planar conductor 3 as in the Preferred Embodiment 1 is less likely to shift the frequency of the communication partner, and thus improves its communication characteristics.

The small-sized planar conductor 3 also enables size reduction of the entire antenna device 1.

With the above principle, the planar conductor 3 defines and functions as a booster that enhances the magnetic flux $\phi 1$ of the coil conductor 5.

When, for example, the conductor line width of the inner circumferential area of the coil conductor 5 is smaller than the conductor line width of the outer circumferential area of the coil conductor 5, the coil opening 53 is able to further enhance its magnetic flux density. More specifically, when the conductor line width of the inner circumferential area of the coil conductor 5 is smaller than the conductor line width of the outer circumferential area, the magnetic flux caused from the inner circumferential area of the coil conductor 5 is likely to circulate in a small circle around the inner circumferential area of the coil conductor 5. Thus, the amount of the magnetic flux that interlinks itself with the inner circumferential portion of the planar conductor 3 increases, that is, the amount of the magnetic flux that does not interlink itself with the inner circumferential portion of the planar conductor 3 decreases, and the amount of the induced current flowing through the planar conductor 3 increases. Thus, the coil opening 53 further enhances its magnetic flux density.

As described above, the antenna device 1 according to the Preferred Embodiment 1 preferably includes the planar conductor 3 disposed so that the first edge 31 of the planar conductor 3 is located on the outer side of the outermost turn of the coil conductor 5 and so that the second edge 32 is located inside the coil opening 53. The first distance A1 between the first coil conductor portion 51 and the first edge 31 of the planar conductor 3 is shorter than the second distance B1 between the first coil conductor portion 51 and the second edge 32 of the planar conductor 3. The shortest distance of the second distance B1 is shorter than the third distance C1 between the center of gravity O1 of the coil opening 53 and the second edge 32 of the planar conductor 3. Thus, the planar conductor 3 allows current to flow through the area of the planar conductor 3 adjacent to the second edge 32, in the direction the same as the direction in which current flows through the coil conductor 5. Thus, the planar conductor 3 defines and functions as a booster without reducing the size of the coil opening 53 of the coil conductor 5. The antenna device 1 thus has favorable communication characteristics while having a small size.

The third distance C1 that is short, or, the conductor opening 33 that is small would hinder the magnetic flux $\phi 1$ from passing through the conductor opening 33, and degrade the communication characteristics. Thus, the third distance C1 is preferably long, for example, longer than the shortest distance of the second distance B1.

In the antenna device 1 according to the Preferred Embodiment 1, the planar conductor 3 includes the slit 34 that connects the area on the outer side of the first edge 31 to the conductor opening 33. Thus, the planar conductor 3, if having an annular shape with the conductor opening 33, allows current to flow through the area of the planar conductor 3 adjacent to the second edge 32, in the direction the same as the direction in which current flows through the coil conductor 5. Thus, the planar conductor 3 can function as a booster.

Modified Examples

Modified examples of the Preferred Embodiment 1 will be described, below.

In the antenna device 1, the coil conductor 5 may be a coil conductor used in near-field radio communication or a coil conductor used in wireless charging.

The planar conductor 3 is not limited to a metal case of a secondary cell, but may alternatively be a metal portion that houses an electronic device 7 (refer to FIG. 6), a ground substrate or a shield box installed in the electronic device 7, or another metal component such as a back metal of a display, for example.

The planar conductor 3 is not limited to being disposed to face the entire antenna element 2 in the first direction D1. For example, the planar conductor 3 may be disposed to face only a portion of the coil conductor 5 in the first direction D1. In other words, the planar conductor 3 may be disposed to face at least a portion of the coil conductor 5 in the first direction D1.

The coil opening 53 of the coil conductor 5 may have any suitable size.

Instead of the single-layer structure as illustrated in FIG. 2, the coil conductor 5 may have a structure including two or more layers.

The number of loops (the number of turns) of the coil conductor 5 is not limited to four. The coil conductor 5 may be coiled in three or less turns, or five or more turns, for example.

The antenna devices 1 according to the above modified examples have the same or substantially the same advantageous effects as the antenna device 1 according to the Preferred Embodiment 1.

Preferred Embodiment 2

Figure 7A:
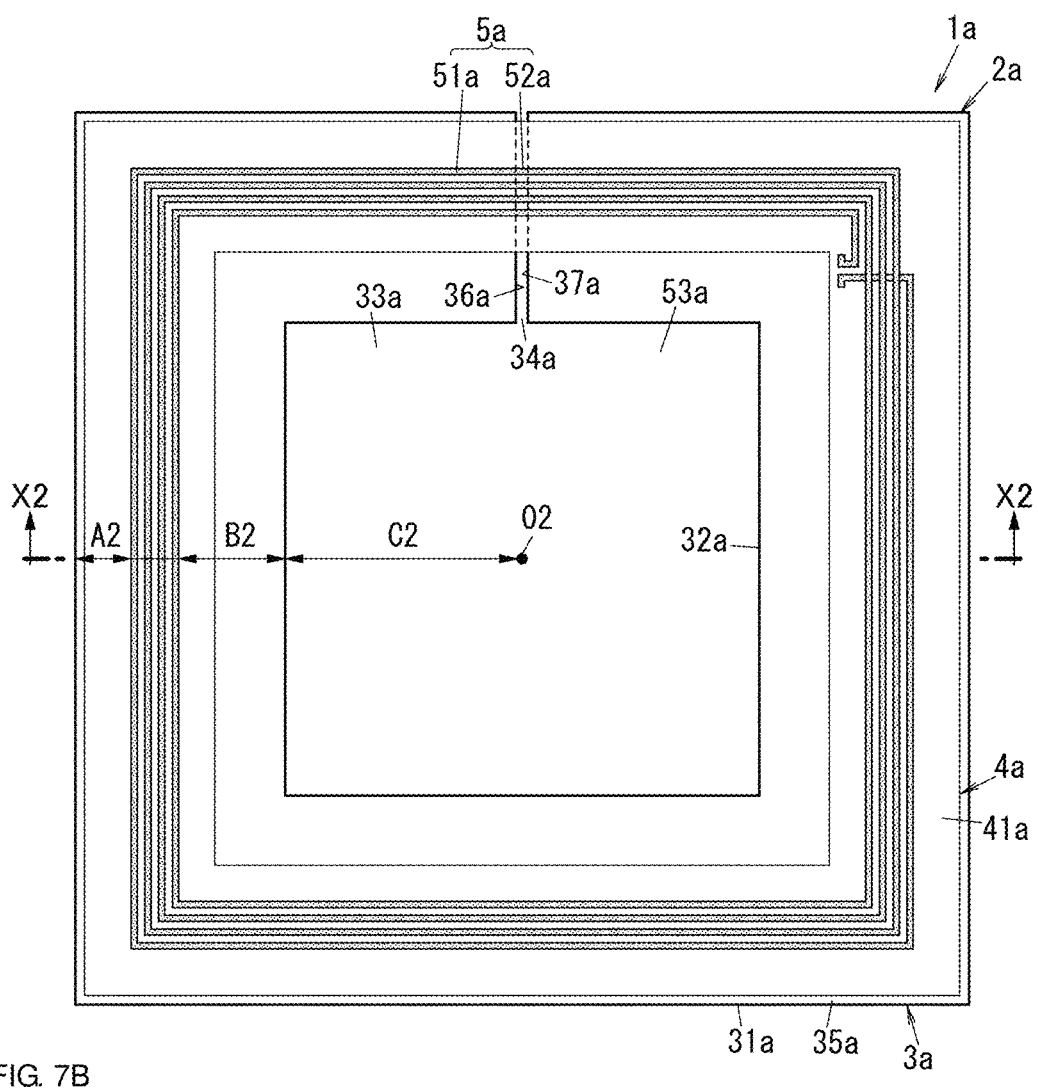
FIG. 7A is a front view of an antenna device according to a Preferred Embodiment 2 of the present invention.

As illustrated in FIG. 7A, an antenna device 1a according to a Preferred Embodiment 2 preferably differs from the antenna device 1 according to the Preferred Embodiment 1 (refer to FIG. 1A) in that a coil conductor 5a and a planar conductor 3a have quadrangular profiles. Components of the antenna device 1a according to the Preferred Embodiment 2 which are the same or substantially the same as those of the antenna device 1 according to the Preferred Embodiment 1 are denoted with the same reference symbols as those of the antenna device 1 according to the Preferred Embodiment 1.

Figure 7B:
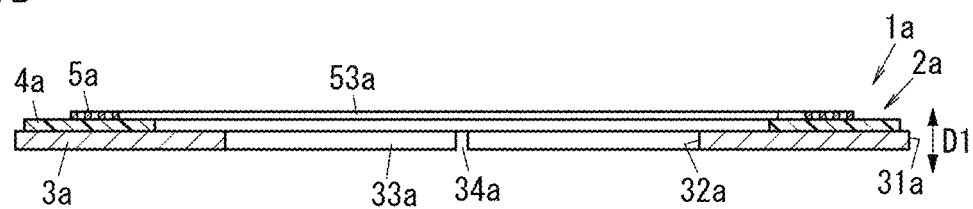
FIG. 7B is a cross-sectional view of the antenna device taken along line X2-X2 of FIG. 7A.
Figure 8:
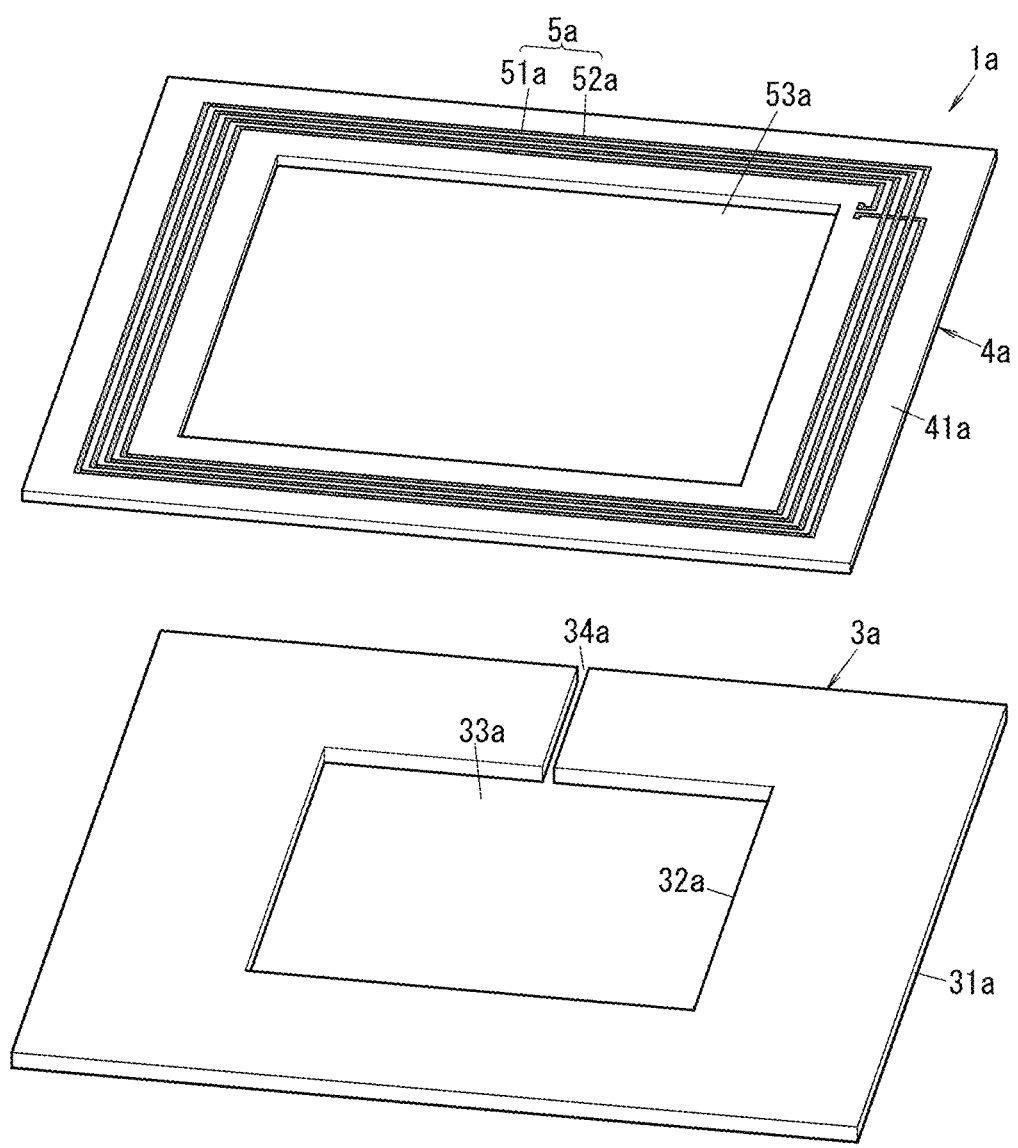
FIG. 8 is an exploded perspective view of the antenna device.

As illustrated in FIGS. 7A, 7B, and FIG. 8, the antenna device 1a according to the Preferred Embodiment 2 includes an antenna element 2a and a planar conductor 3a. The antenna element 2a includes a base 4a and a coil conductor 5a.

The base 4a is preferably a flexible printed circuit board made of synthetic resin, for example. The base 4a is preferably, for example, a square or substantially square frame. Components and functions of the base 4a according to the Preferred Embodiment 2 the same or substantially the same as those of the base 4 according to the Preferred Embodiment 1 (refer to FIG. 1A) are not described.

The coil conductor 5a preferably has a square or substantially square frame shape. The coil conductor 5a is disposed on a main surface 41a of the base 4a. Components and functions of the coil conductor 5a according to the Preferred Embodiment 2 the same or substantially the same as those of the coil conductor 5 according to the Preferred Embodiment 1 (refer to FIG. 1A) are not described.

The planar conductor 3a preferably has a square or substantially square frame shape. The planar conductor 3a includes a first edge 31a and a second edge 32a, across from each other, and a third edge 36a and a fourth edge 37a, opposing each other. The planar conductor 3a also includes a conductor opening 33a and a slit 34a. The slit 34a is disposed between the third edge 36a and the fourth edge 37a. The planar conductor 3a includes a main surface 35a, which at least partially overlaps with the antenna element 2a when the main surface 35a is viewed in a plan in the first direction D1. Components and functions of the planar conductor 3a according to Preferred Embodiment 2 the same or substantially the same as those of the planar conductor 3 according to the Preferred Embodiment 1 (refer to FIG. 1A) will not be described.

As in the antenna device 1 according to the Preferred Embodiment 1, in the antenna device 1a according to the Preferred Embodiment 2, the planar conductor 3a faces the coil conductor 5a when the planar conductor 3a is viewed in a plan. More specifically, when the planar conductor 3a is viewed in a plan, the planar conductor 3a faces the coil conductor 5a so that the first edge 31a is disposed on the outer side beyond the coil conductor 5a and so that the second edge 32a is disposed in a coil opening 53a of the coil conductor 5a.

A first coil conductor portion 51a of the coil conductor 5a faces the planar conductor 3a to at least partially overlap with the planar conductor 3a when the planar conductor 3a is viewed in a plan view. A second coil conductor portion 52a does not overlap with the planar conductor 3a when the planar conductor 3a is viewed in a plan view.

In the coil conductor 5a and the planar conductor 3a, throughout the first coil conductor portion 51a, on the straight line passing through the center of gravity O2 of the coil opening 53a, a first distance A2 between the first coil conductor portion 51a and the first edge 31a of the planar conductor 3a is shorter than a second distance B2 between the first coil conductor portion 51a and the second edge 32a of the planar conductor 3a. Here, the first distance A2 is a distance between the outermost turn of the first coil conductor portion 51a and the first edge 31a of the planar conductor 3a. The second distance B2 is a distance between the innermost turn of the first coil conductor portion 51a and the second edge 32a of the planar conductor 3a.

On the straight line passing a portion of the second edge 32a of the planar conductor 3a at which the second distance B2 is shortest, the shortest distance of the second distance B2 is shorter than a third distance C2 between the center of gravity O2 of the coil opening 53a and the second edge 32a of the planar conductor 3a. Here, the center of gravity O2 of the coil opening 53a overlaps with the center of mass of the coil opening 53a if the coil opening 53a would be an object having a uniform mass. As in the case of the Preferred Embodiment 1, the third distance C2 that is short, or, the conductor opening 33a that is small would hinder the magnetic flux ϕ1 from passing through the conductor opening 33a, and degrade the communication characteristics. Thus, the third distance C2 is preferably long, for example, longer than the shortest distance of the second distance B2.

The operation of the antenna device 1a according to the Preferred Embodiment 2 is preferably the same or substantially the same as the operation of the antenna device 1 according to the Preferred Embodiment 1. Examples of applications of the antenna device 1a according to the Preferred Embodiment 2 are the same or substantially the same as those of the antenna device 1 according to the Preferred Embodiment 1.

As described above, in the antenna device 1a according to the Preferred Embodiment 2, as in the antenna device 1 according to the Preferred Embodiment 1, the planar conductor 3a allows current to flow through the second edge 32a of the planar conductor 3a in the direction the same as the direction in which current flows through the coil conductor 5a. Thus, the planar conductor 3a defines and functions as a booster without reducing the size of the coil opening 53a of the coil conductor 5a. The antenna device 1a thus has favorable communication characteristics while having a small size.

Modified Examples of Preferred Embodiment 2

Modified examples of the Preferred Embodiment 2 include the followings.

The coil conductor 5a may have a shape other than an annular or square frame. The coil conductor 5a may have a shape of, for example, a quadrangular frame such as a rectangular frame when viewed in a plan in the first direction D1. Alternatively, the coil conductor 5a may have a shape of a polygon other than a quadrangle when viewed in a plan in the first direction D1.

The planar conductor 3a may have a shape other than an annular or square frame. The planar conductor 3a may have a shape of, for example, a quadrangular frame such as a rectangular frame when viewed in a plan in the first direction D1. Alternatively, the planar conductor 3a may have a shape of a polygon other than a quadrangle when viewed in a plan in the first direction D1.

The antenna devices 1a according to the above modified examples also have the same or substantially the same advantageous effects as the antenna device 1a according to the Preferred Embodiment 2.

Preferred Embodiment 3

Figures 9A, 9B:
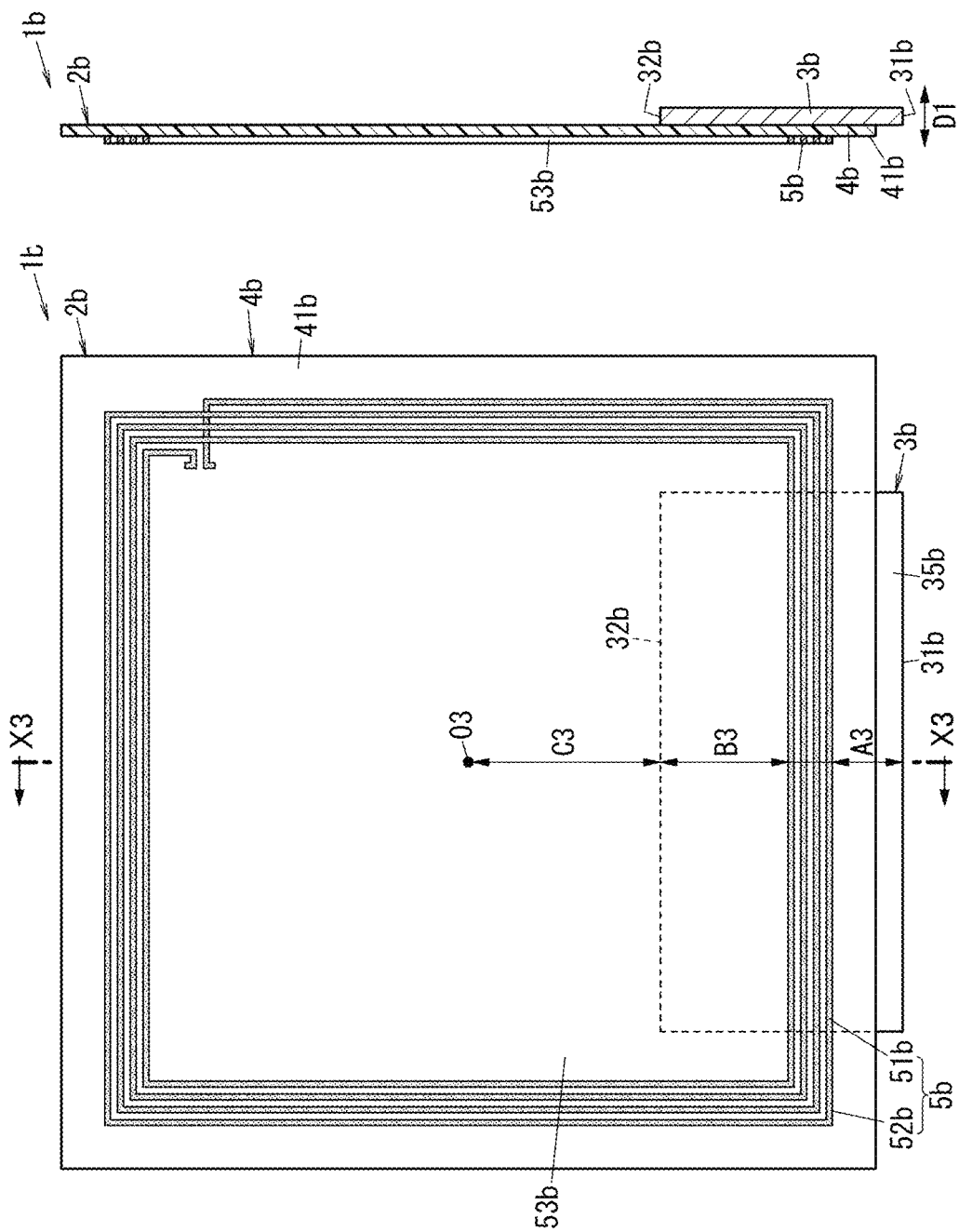
FIG. 9A is a front view of an antenna device according to a Preferred Embodiment 3 of the present invention.
FIG. 9B is a cross-sectional view of the antenna device taken along line X3-X3 of FIG. 9A.

An antenna device 1b according to a Preferred Embodiment 3 preferably differs from the antenna device 1 according to the Preferred Embodiment 1 (refer to FIG. 1A) in that, the antenna device 1b includes a planar conductor 3b that includes no conductor opening, as illustrated in FIG. 9A. Components of the antenna device 1b according to the Preferred Embodiment 3 the same or substantially the same as those of the antenna device 1 according to the Preferred Embodiment 1 are denoted with the same reference symbols and not described.

Figure 10:
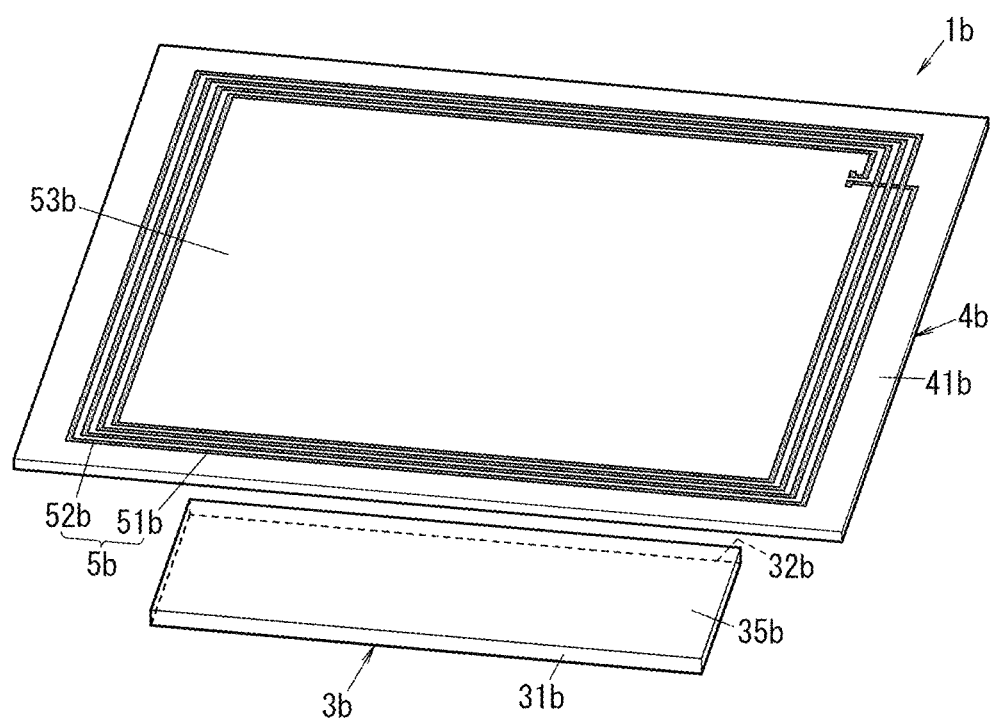
FIG. 10 is an exploded perspective view of the antenna device.

As illustrated in FIGS. 9A, 9B, and FIG. 10, the antenna device 1b according to the Preferred Embodiment 3 includes an antenna element 2b and a planar conductor 3b. The antenna element 2b includes a base 4b and a coil conductor 5b.

The base 4b is preferably a flexible printed circuit board made of synthetic resin, for example. The base 4b has a square or substantially square frame shape. Components and functions of the base 4b according to the Preferred Embodiment 3 the same or substantially the same as those of the base 4 (refer to FIG. 1A) according to the Preferred Embodiment 1 are not described.

The coil conductor 5b has a square or substantially square frame shape. The coil conductor 5b is disposed on a main surface 41b of the base 4b. Components and functions of the coil conductor 5b according to the Preferred Embodiment 3 the same or substantially the same as those of the coil conductor 5 (refer to FIG. 1A) according to the Preferred Embodiment 1 are not described.

The planar conductor 3b is preferably defined by a solid rectangular plate. The planar conductor 3b includes a first edge 31b and a second edge 32b, across from each other. The planar conductor 3b includes a main surface 35b, which at least partially overlaps with the antenna element 2b when the main surface 35b is viewed in a plan in the first direction D1. The planar conductor 3b is disposed to at least partially overlap with one side of the quadrangular coil conductor 5b when the planar conductor 3b is viewed in a plan. Components and functions of the planar conductor 3b according to the Preferred Embodiment 3 the same or substantially the same as those of the planar conductor 3 (refer to FIG. 1A) according to Preferred Embodiment 1 are not described.

As in the antenna device 1 according to the Preferred Embodiment 1, also in the antenna device 1b according to the Preferred Embodiment 3, the planar conductor 3b faces the coil conductor 5b when the planar conductor 3b is viewed in a plan. More specifically, the planar conductor 3b faces the coil conductor 5b so that the first edge 31b is disposed on the outer side beyond the coil conductor 5b and so that the second edge 32b is disposed in a coil opening 53b of the coil conductor 5b when the planar conductor 3b is viewed in a plan.

In the coil conductor 5b, a first coil conductor portion 51b faces the planar conductor 3b to at least partially overlap with the planar conductor 3b when the planar conductor 3b is viewed in a plan. A second coil conductor portion 52b does not overlap with the planar conductor 3b when the planar conductor 3b is viewed in a plan.

In the coil conductor 5b and the planar conductor 3b, throughout the first coil conductor portion 51b, on the straight line passing through a center of gravity O3 of the coil opening 53b, a first distance A3 between the first coil conductor portion 51b and a first edge 31b of the planar conductor 3b is shorter than a second distance B3 between the first coil conductor portion 51b and a second edge 32b of the planar conductor 3b. Here, the first distance A3 is a distance between the outermost turn of the first coil conductor portion 51b and the first edge 31b of the planar conductor 3b. The second distance B3 is a distance between the innermost turn of the first coil conductor portion 51b and the second edge 32b of the planar conductor 3b. As in the case of the Preferred Embodiment 1, the third distance C3 that is short would hinder the magnetic flux ϕ1 from passing the area closer to the center of gravity O3 than the second edge 32b, and degrade the communication characteristics. Thus, the third distance C3 is preferably long, for example, longer than the shortest distance of the second distance B3.

On the straight line passing a portion of the second edge 32b of the planar conductor 3b at which the second distance B3 is shortest, the shortest distance of the second distance B3 is shorter than a third distance C3 between the center of gravity O3 of the coil opening 53b and the second edge 32b of the planar conductor 3b. Here, the center of gravity O3 of the coil opening 53b overlaps with the center of mass of the coil opening 53b if the coil opening 53b would be an object having a uniform mass. Alternatively, the center of mass of the coil conductor 5b may be the center of gravity O3 of the coil opening 53b.

The operation of the antenna device 1b according to the Preferred Embodiment 3 will now be described with reference to FIGS. 11A, 11B, and FIG. 12. Arrows in FIGS. 11A and 11B denote the directions of current.

Figure 11A:
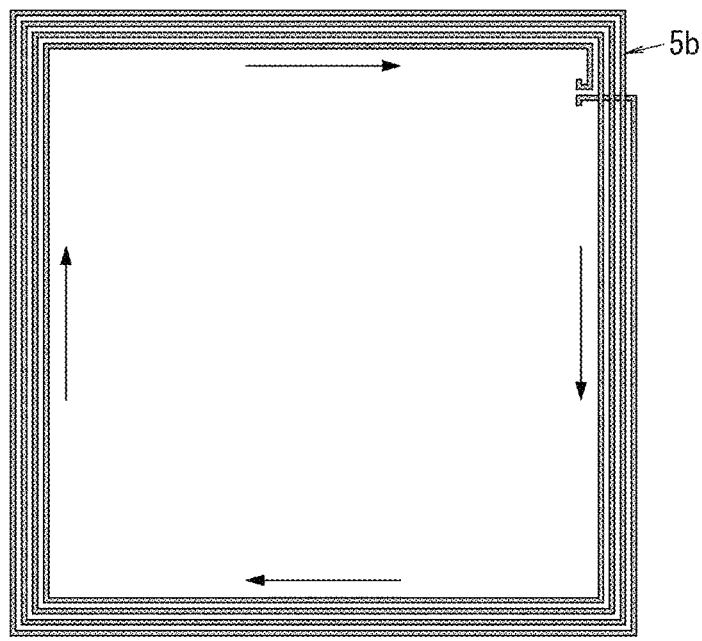
FIG. 11A is a schematic diagram of a current flow of a coil conductor in the antenna device.
Figure 11B:
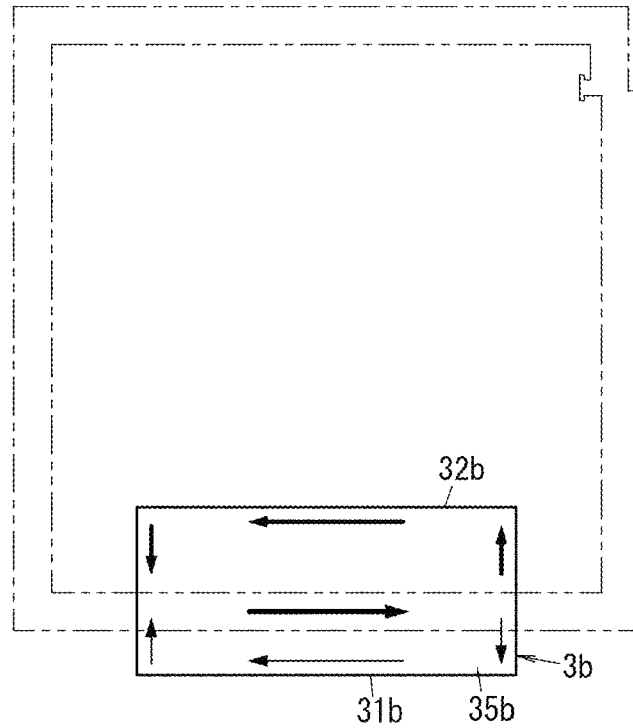
FIG. 11B is a schematic diagram of a current flow of a planar conductor in the antenna device.
Figure 12:
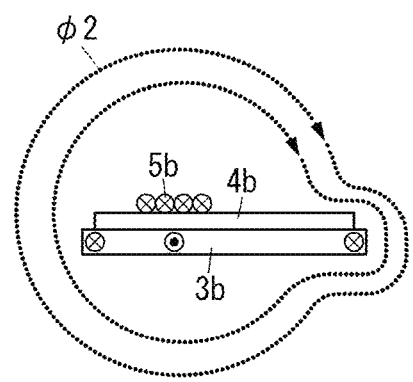
FIG. 12 is a schematic diagram of a magnetic flux of the antenna device.

As illustrated in FIG. 11A, when current flows through the coil conductor 5b, an induced current flows through the planar conductor 3b due to magnetic field coupling, as illustrated in FIG. 11B. More specifically, when current flows through the coil conductor 5b, as illustrated in FIG. 11B, an induced current flows, in a direction opposite to the direction in which current flows through the coil conductor 5b, through a portion of the planar conductor 3b that at least partially overlaps with the coil conductor 5b when the planar conductor 3b is viewed in a plan.

The planar conductor 3b is quadrangular. Thus, as illustrated in FIG. 11B, current flows, in the direction the same as the direction in which current flows through the coil conductor 5b, through an area of the planar conductor 3b closer to the first edge 31b (outer area) and an area of the planar conductor 3b closer to the second edge 32b (inner area) that do not overlap with the coil conductor 5b. As illustrated in FIG. 12, current flowing through the area of the planar conductor 3b closer to the first edge 31b and the area of the planar conductor 3b closer to the second edge 32b causes a magnetic flux directed in the same direction as a magnetic flux ϕ2 caused by the current of the coil conductor 5b.

The coil conductor 5b is disposed on the planar conductor 3b closer to the first edge 31b than to the second edge 32b. Thus, a larger amount of the magnetic flux ϕ2 caused by the current flowing through the coil conductor 5b passes around the second edge 32b of the planar conductor 3b than around the first edge 31b of the planar conductor 3b. Thus, a larger amount of an induced current flows through the second edge 32b of the planar conductor 3b than the first edge 31b of the planar conductor 3b.

Thus, the coil opening 53b has a higher magnetic flux density than the area on the outer side of the coil conductor 5b, and the induced current flowing through the second edge 32b of the planar conductor 3b can further enhance the magnetic flux density of the coil opening 53b.

As in the case of the Preferred Embodiment 1, the antenna device 1b including a small planar conductor 3b is less likely to shift the frequency of a communication partner when being adjacent to the communication partner, and improves the communication characteristics. As in the case of the Preferred Embodiment 1, the antenna device 1b including a small planar conductor 3b enables size reduction of the entirety of the antenna device 1b.

With the above principle, also in the antenna device 1b according to the Preferred Embodiment 3, the planar conductor 3b defines and functions as a booster that enhances the magnetic flux ϕ2 of the coil conductor 5b.

Example applications of the antenna device 1b according to the Preferred Embodiment 3 are the same or substantially the same as those of the antenna device 1 according to the Preferred Embodiment 1.

As described above, as in the case of the antenna device 1 according to the Preferred Embodiment 1, in the antenna device 1b according to the Preferred Embodiment 3, the planar conductor 3b allows current to flow through the second edge 32b of the planar conductor 3b in the direction the same as the direction in which current flows through the coil conductor 5b. Thus, the planar conductor 3b defines and functions as a booster without reducing the size of the coil opening 53b of the coil conductor 5b. Thus, the antenna device 1b has favorable communication characteristics while having a small size.

Modified Examples of Preferred Embodiment 3

Figure 13:
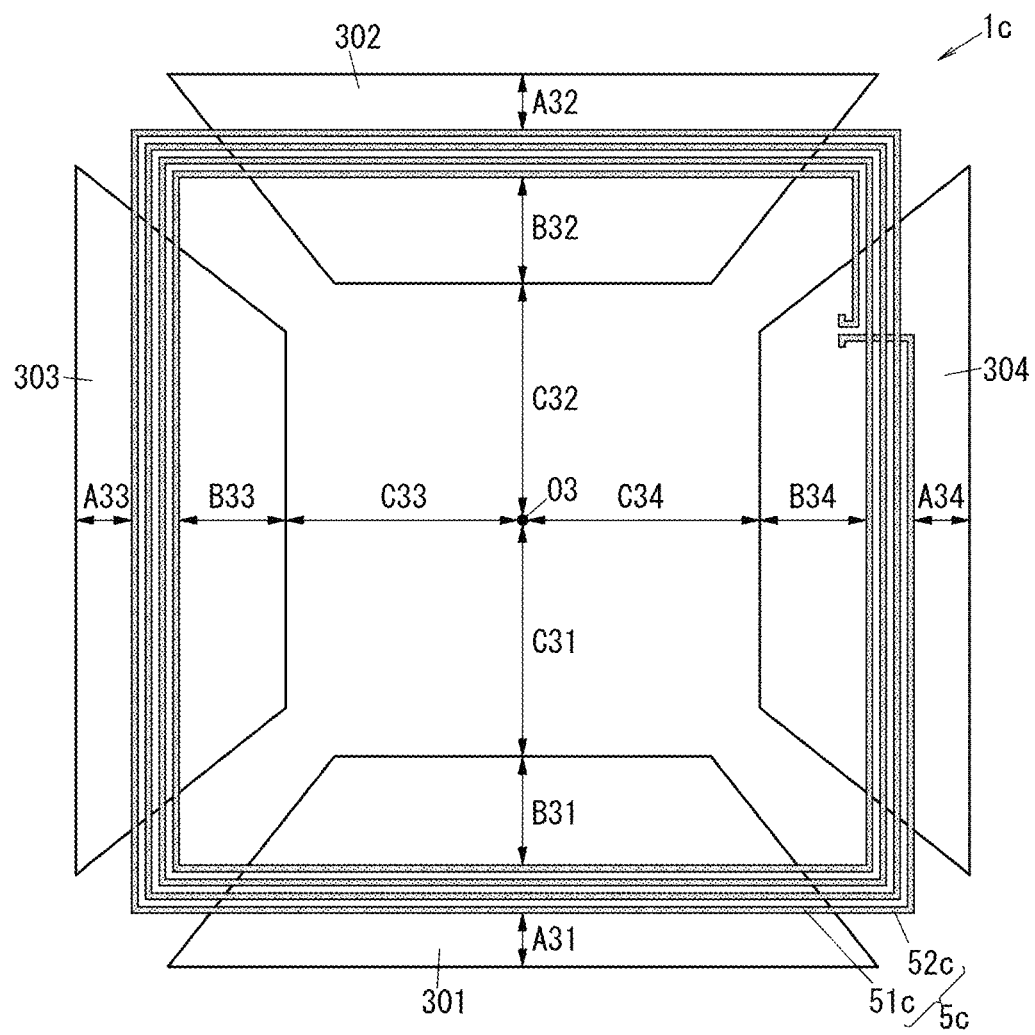
FIG. 13 is a front view of an antenna device according to a Modified Example 1 of the Preferred Embodiment 3 of the present invention.

An antenna device 1c according to a Modified Example 1 of the Preferred Embodiment 3 may include multiple (four in the illustrated example) planar conductors 301 to 304, as illustrated in FIG. 13. The multiple planar conductors 301 to 304 are preferably trapezoidal.

In the Modified Example 1, a coil conductor 5c includes multiple (four in the illustrated example) first coil conductor portions 51c and multiple (four in the illustrated example) second coil conductor portions 52c. The multiple first coil conductor portions 51c correspond one to one to the multiple planar conductors 301 to 304, and at least partially overlap with the corresponding planar conductors 301 to 304. The multiple second coil conductor portions 52c do not overlap with any of the multiple planar conductors 301 to 304.

In the coil conductor 5c and the planar conductors 301 to 304, throughout the entireties of the first coil conductor portions 51c, a first distance A31 between the first coil conductor portions 51c and the first edge of the planar conductor 301 is shorter than a second distance B31 between the first coil conductor portions 51c and the second edge of the planar conductor 301. The second distance B31 is shorter than a third distance C31 between the center of gravity O3 and the second edge of the planar conductor 301. Similarly, a first distance A32 is shorter than a second distance B32, and the second distance B32 is shorter than a third distance C32. A first distance A33 is shorter than a second distance B33, and the second distance B33 is shorter than a third distance C33. A first distance A34 is shorter than a second distance B34, and the second distance B34 is shorter than a third distance C34.

In the Modified Example 1, the number of planar conductors may be two, three, five, or more, instead of four.

Figure 14:
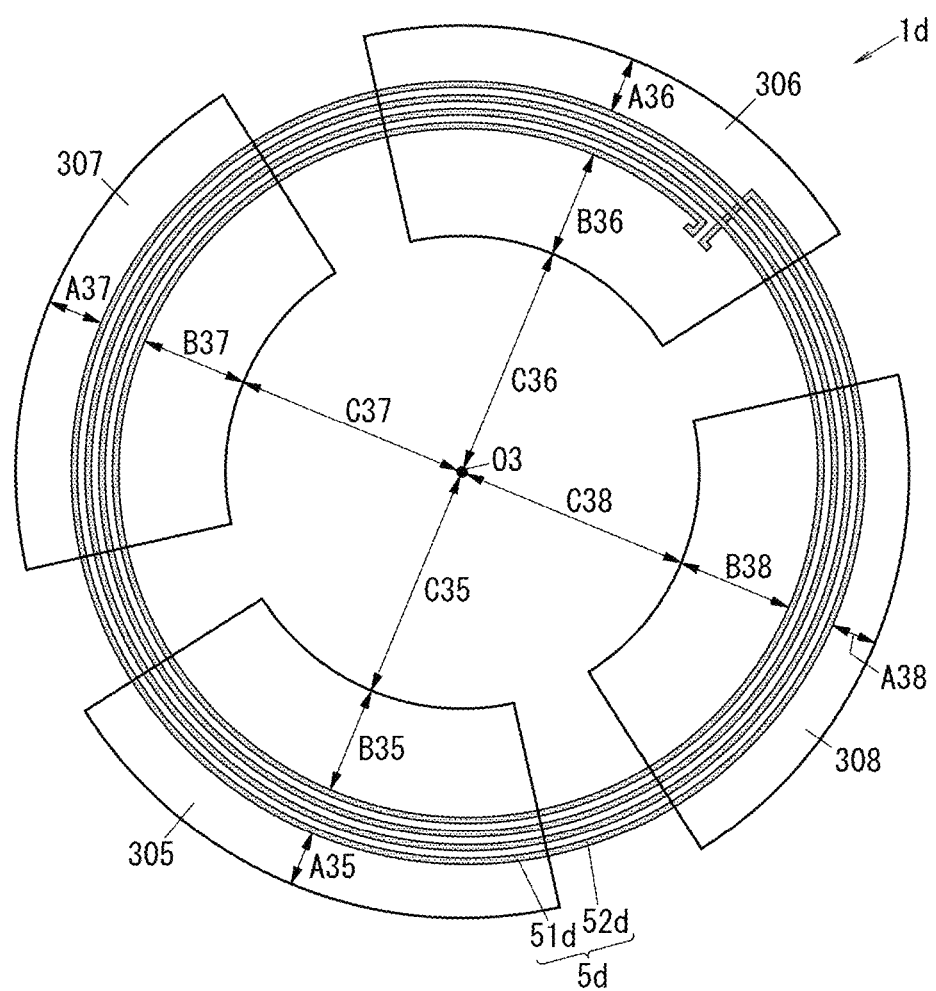
FIG. 14 is a front view of an antenna device according to a Modified Example 2 of the Preferred Embodiment 3 of the present invention.

An antenna device 1d according to a Modified Example 2 of the Preferred Embodiment 3 may include multiple (four in the illustrated example) discontinuous planar conductors 305 to 308 spaced apart about a circumference of the coil conductor 5c, as illustrated in FIG. 14. The multiple planar conductors 305 to 308 preferably have a fan or trapezoidal shape.

In the Modified Example 2, a coil conductor 5d includes multiple (four in the illustrated example) first coil conductor portions 51d and multiple (four in the illustrated example) second coil conductor portions 52d. The multiple first coil conductor portions 51d correspond one to one to the multiple planar conductors 305 to 308, and at least partially overlap with the corresponding planar conductors 305 to 308. The multiple second coil conductor portions 52d do not overlap with any of the multiple planar conductors 305 to 308.

In the coil conductor 5d and the planar conductors 305 to 308, throughout the entireties of the first coil conductor portions 51d, a first distance A35 between the first coil conductor portions 51d and the first edge of the planar conductor 305 is shorter than a second distance B35 between the first coil conductor portions 51d and the second edge of the planar conductor 305. The second distance B35 is shorter than a third distance C35 between the center of gravity O3 and the second edge of the planar conductor 305. Similarly, a first distance A36 is shorter than a second distance B36, and the second distance B36 is shorter than a third distance C36. A first distance A37 is shorter than a second distance B37, and the second distance B37 is shorter than a third distance C37. A first distance A38 is shorter than a second distance B38, and the second distance B38 is shorter than a third distance C38.

In the Modification Example 2, the number of planar conductors may be two, three, five, or more, instead of four.

As described above, the planar conductor is not limited to have a rectangular shape as illustrated in the Preferred Embodiment 3, and may have a trapezoidal shape as illustrated in the Modified Example 1, or, a fan shape as illustrated in the Modified Example 2. Alternatively, the planar conductor may have any other shape as appropriate.

The coil conductors 5b and 5c may have a shape other than a square frame shape. The coil conductors 5b and 5c may have a shape of, for example, a quadrangular frame such as a rectangular or substantially rectangular frame when viewed in a plan in the first direction D1. Alternatively, the coil conductors 5b and 5c may have a shape of a polygon other than a quadrangle when viewed in a plan in the first direction D1. Alternatively, the coil conductors 5b and 5c may have an annular shape when viewed in a plan in the first direction D1.

The coil conductor 5d may have a shape other than an annular shape. The coil conductor 5d may have a shape of, for example, a quadrangular frame such as a square, substantially square, rectangular, or substantially rectangular frame when viewed in a plan in the first direction D1. Alternatively, the coil conductor 5d may have a shape of a polygon other than a quadrangle when viewed in a plan in the first direction D1.

Preferred Embodiment 4

Figure 15A:
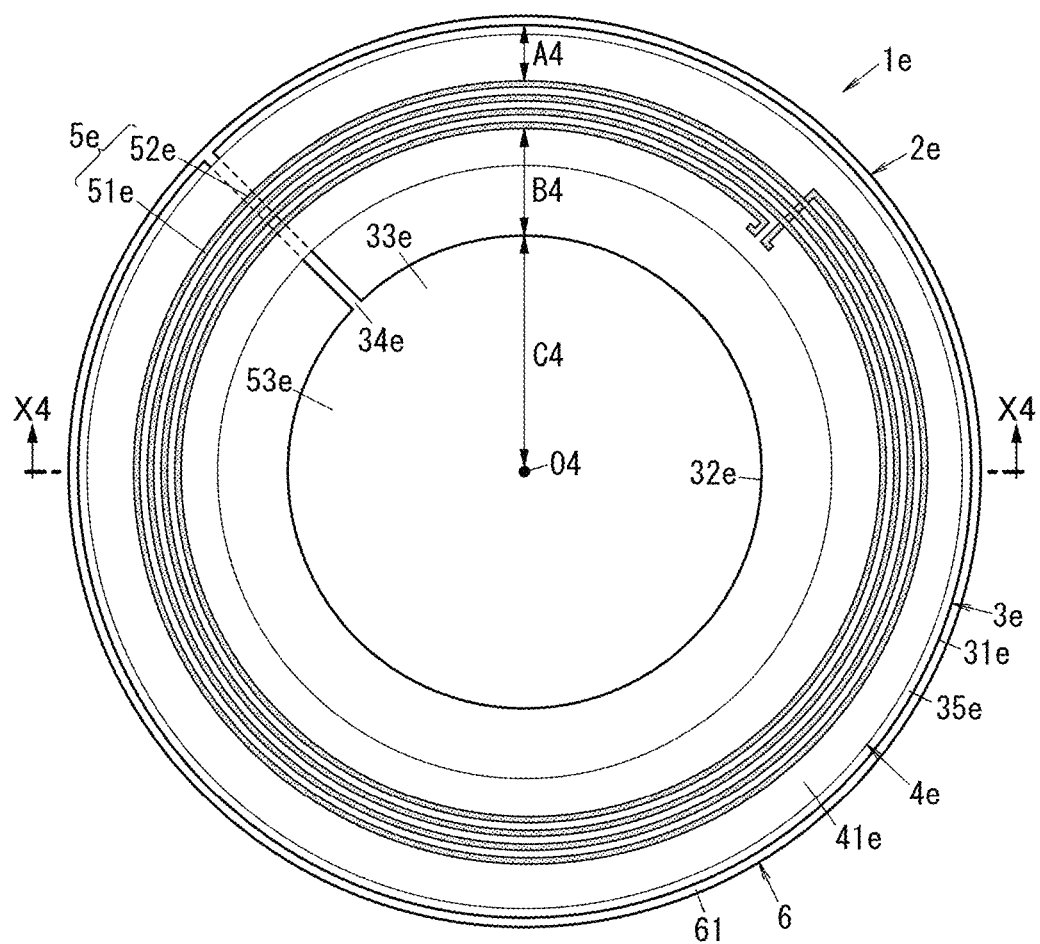
FIG. 15A is a front view of an antenna device according to a Preferred Embodiment 4 of the present invention.

As illustrated in FIG. 15A, an antenna device 1e according to a Preferred Embodiment 4 preferably differs from the antenna device 1 according to the Preferred Embodiment 1 (refer to FIG. 1A) in that the antenna device 1e includes a magnetic body 6. Components of the antenna device 1e according to the Preferred Embodiment 4 the same or substantially the same as those of the antenna device 1 according to the Preferred Embodiment 1 are denoted with the same reference symbols and not described.

Figure 15B:
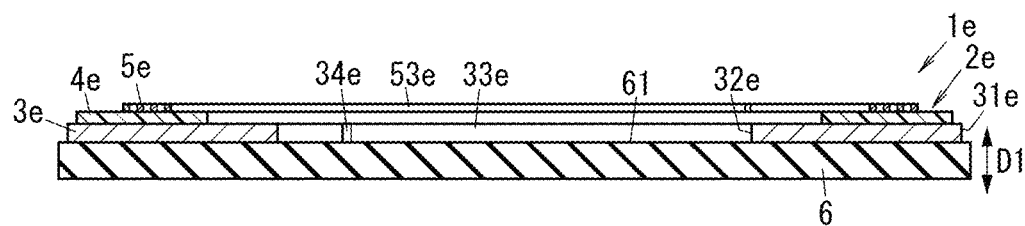
FIG. 15B is a cross-sectional view of the antenna device taken along line X4-X4 in FIG. 15A.
Figure 16:
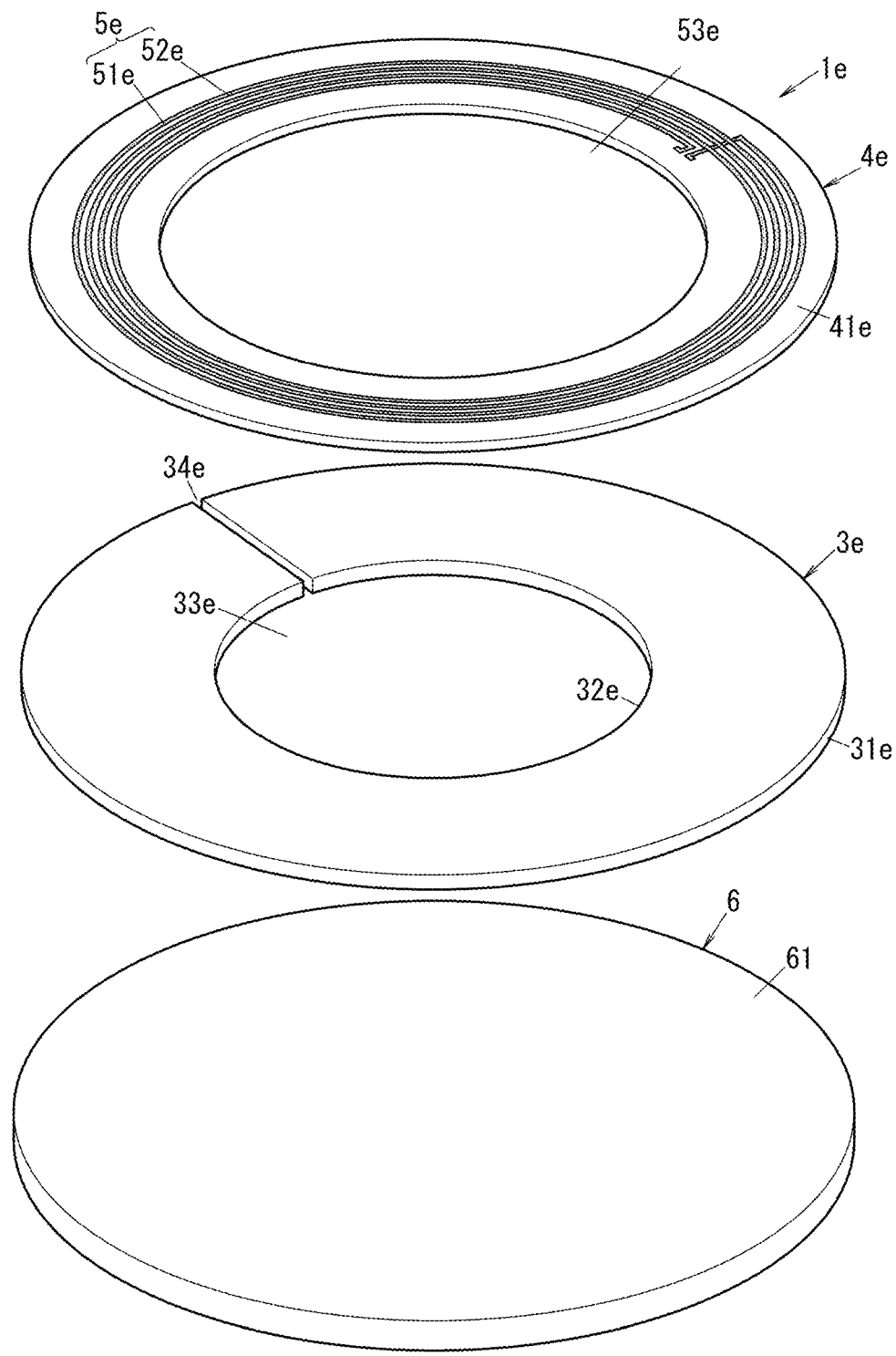
FIG. 16 is an exploded perspective view of the antenna device.

As illustrated in FIGS. 15A, 15B, and FIG. 16, the antenna device 1e according to the Preferred Embodiment 4 includes an antenna element 2e and a planar conductor 3e. As in the case of the planar conductor 3 according to the Preferred Embodiment 1, the planar conductor 3e preferably includes a conductor opening 33e and a slit 34e. Specifically, the planar conductor 3e is preferably the same or substantially the same as the planar conductor 3 according to the Preferred Embodiment 1 and is thus not described.

The antenna element 2e includes a base 4e, a coil conductor 5e, and a magnetic body 6. The coil conductor 5e is disposed on a main surface 41e of the base 4e. The base 4e is the same or substantially the same as the base 4 according to the Preferred embodiment 1 and is thus not described. The coil conductor 5e is the same or substantially the same as the coil conductor 5 according to the Preferred Embodiment 1 and is thus not described.

The magnetic body 6 is preferably provided as a circular plate or circular sheet, and includes a main surface 61. The magnetic body 6 is preferably made of a ferromagnetic material such as ferrite, for example. For example, the magnetic body 6 is a sintered ferrite, amorphous magnetic, or magnetic sheet. Examples of a ferromagnetic material used for the magnetic body 6 include Mn—Zn—Fe ferrite and Ni—Zn—Fe ferrite. The magnetic body 6 has a higher magnetic permeability than the planar conductor 3e and a protective layer (not illustrated).

The magnetic body 6 at least partially overlaps with the planar conductor 3e when the planar conductor 3e is viewed in a plan. More specifically, the magnetic body 6 faces the planar conductor 3e. Here, the expression that "the magnetic body 6 faces the planar conductor 3e" refers to the situation where either one or both of a magnetic member made of a magnetic body other than the magnetic body 6 and a conductive member made of a conductor other than the planar conductor 3e is/are not disposed between the magnetic body 6 and the planar conductor 3e. In the Preferred Embodiment 4, the magnetic body 6 is preferably directly in contact with the planar conductor 3e. Alternatively, an adhesive or resin such as a protection film may be disposed between the magnetic body 6 and the planar conductor 3e.

In the Preferred Embodiment 4, the planar conductor 3e is disposed between the coil conductor 5e and the magnetic body 6 in a direction normal to the planar conductor 3e. More specifically, in the direction normal to the planar conductor 3e, the planar conductor 3e is disposed between the coil conductor 5e and the magnetic body 6 so that a main surface 35e of the planar conductor 3e faces the coil conductor 5e with the base 4e interposed therebetween. The coil conductor 5e is disposed on the main surface 41e of the base 4e. The direction normal to the planar conductor 3e refers to a direction perpendicular or substantially perpendicular to the planar conductor 3e.

In the coil conductor 5e and the planar conductor 3e, throughout the entire first coil conductor portion 51e, on the straight line passing through the center of gravity O4 of a coil opening 53e, a first distance A4 between the first coil conductor portion 51e and a first edge 31e of the planar conductor 3e is shorter than a second distance B4 between the first coil conductor portion 51e and a second edge 32e of the planar conductor 3e. In addition, the second distance B4 is shorter than a third distance C4 between the center of gravity O4 of the coil opening 53e and the second edge 32e of the planar conductor 3e.

The operation of the antenna device 1e according to the Preferred Embodiment 4 is preferably the same or substantially the same as the antenna device 1 according to the Preferred Embodiment 1. In addition, application examples of the antenna device 1e according to the Preferred Embodiment 4 are the same or substantially the same as those of the antenna device 1 according to the Preferred Embodiment 1.

As described above, the antenna device 1e according to the Preferred Embodiment 4 includes the magnetic body 6 disposed to at least partially overlap with the planar conductor 3e. The antenna device 1e thus allows a magnetic flux caused by current flowing through the second edge 32e of the planar conductor 3e to easily pass through the coil opening 53e of the coil conductor 5e using the magnetic body 6. The antenna device 1e thus enhances the magnetic flux density of the coil opening 53e of the coil conductor 5e.

In the antenna device 1e according to the Preferred Embodiment 4, in a direction normal to the planar conductor 3e, the planar conductor 3e is disposed between the coil conductor 5e and the magnetic body 6. This structure allows the magnetic body 6 to be located closer to the planar conductor 3e. The antenna device 1e thus allows a larger amount of a magnetic flux caused by current flowing through the second edge 32e of the planar conductor 3e to pass through the coil opening 53e of the coil conductor 5e using the magnetic body 6.

Modified Example According to Preferred Embodiment 4

Figure 17:
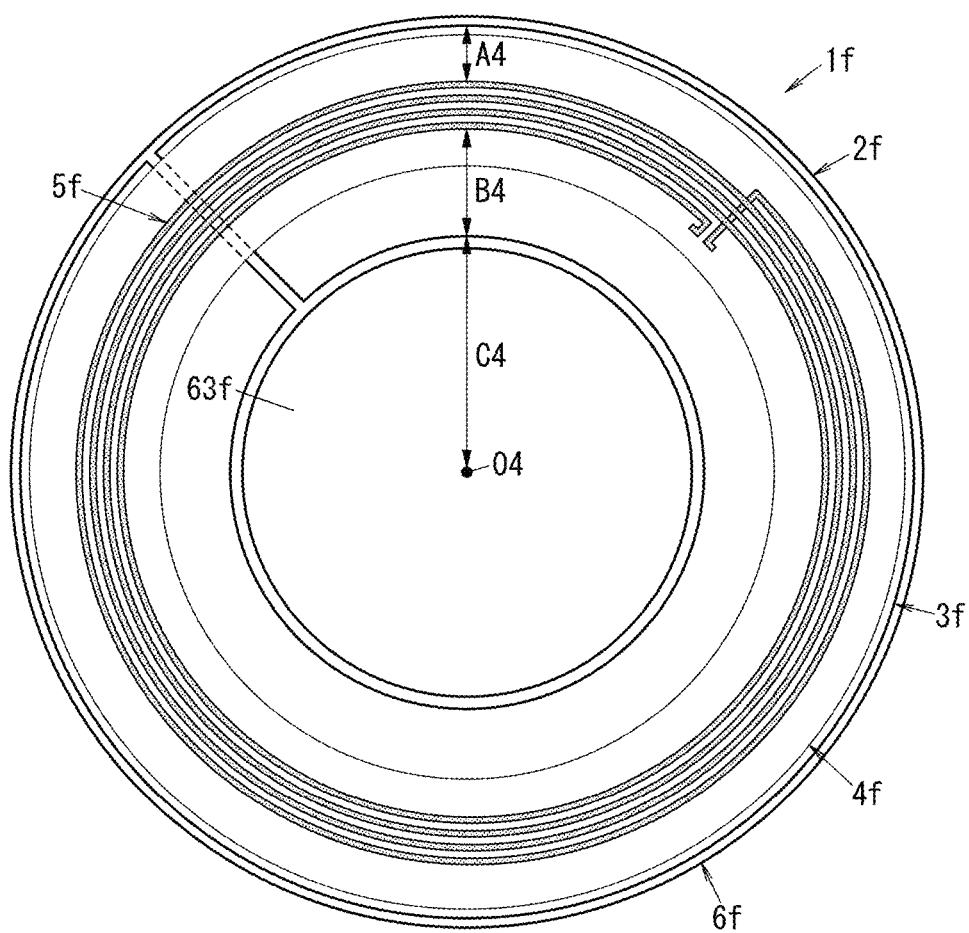
FIG. 17 is a front view of an antenna device according to a modified example of the Preferred Embodiment 4 of the present invention.

An antenna element 2f of an antenna device 1f according to a modified example of the Preferred Embodiment 4 may include, instead of the magnetic body 6, a magnetic body 6f that includes a magnetic body opening 63f, as illustrated in FIG. 17. A planar conductor 3f according to the present modified example is the same or substantially the same as the planar conductor 3e according to the Preferred Embodiment 4. A base 4f according to the present modified example is the same as the base 4e according to the Preferred Embodiment 4. A coil conductor 5f according to the present modified example is the same or substantially the same as the coil conductor 5e according to the Preferred Embodiment 4.

The antenna device 1f according to the present modified example also has the same or substantially the same advantageous effects as the antenna device 1e according to the Preferred Embodiment 4.

Preferred Embodiment 5

Figure 18A:
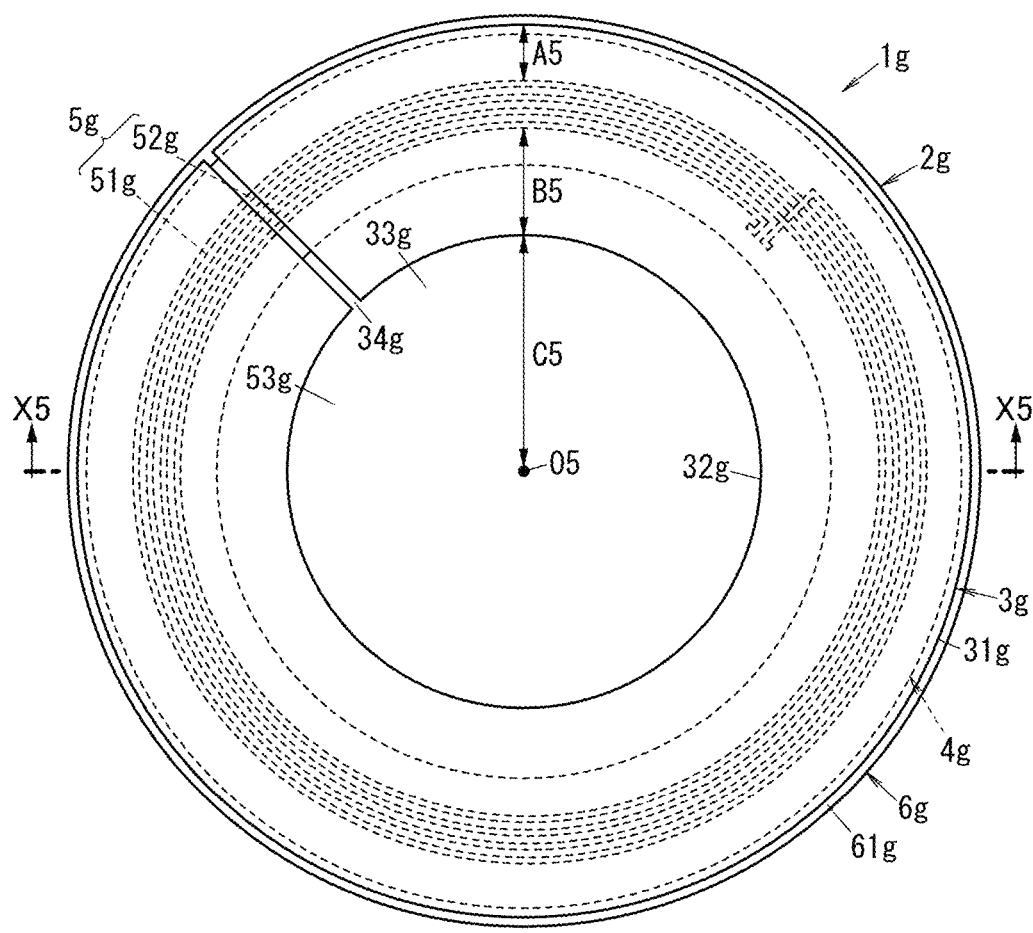
FIG. 18A is a front view of an antenna device according to a Preferred Embodiment 5 of the present invention.
Figure 18B:
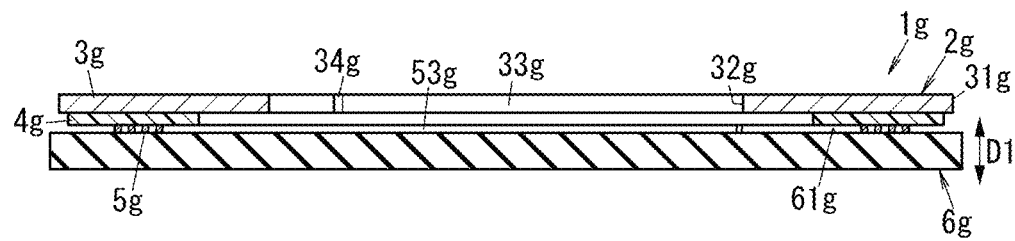
FIG. 18B is a cross-sectional view of the antenna device taken along line X5-X5 of FIG. 18A.

As illustrated in FIGS. 18A and 18B, an antenna device 1g according to the Preferred Embodiment 5 preferably differs from the antenna device 1e according to the Preferred Embodiment 4 (refer to FIGS. 15A and 15B) in that the antenna device 1g includes a coil conductor 5g between a planar conductor 3g and a magnetic body 6g. Components of the antenna device 1g according to the Preferred Embodiment 5 the same or substantially the same as those of the antenna device 1e according to the Preferred Embodiment 4 are denoted with the same reference symbols and not described.

Figure 19:
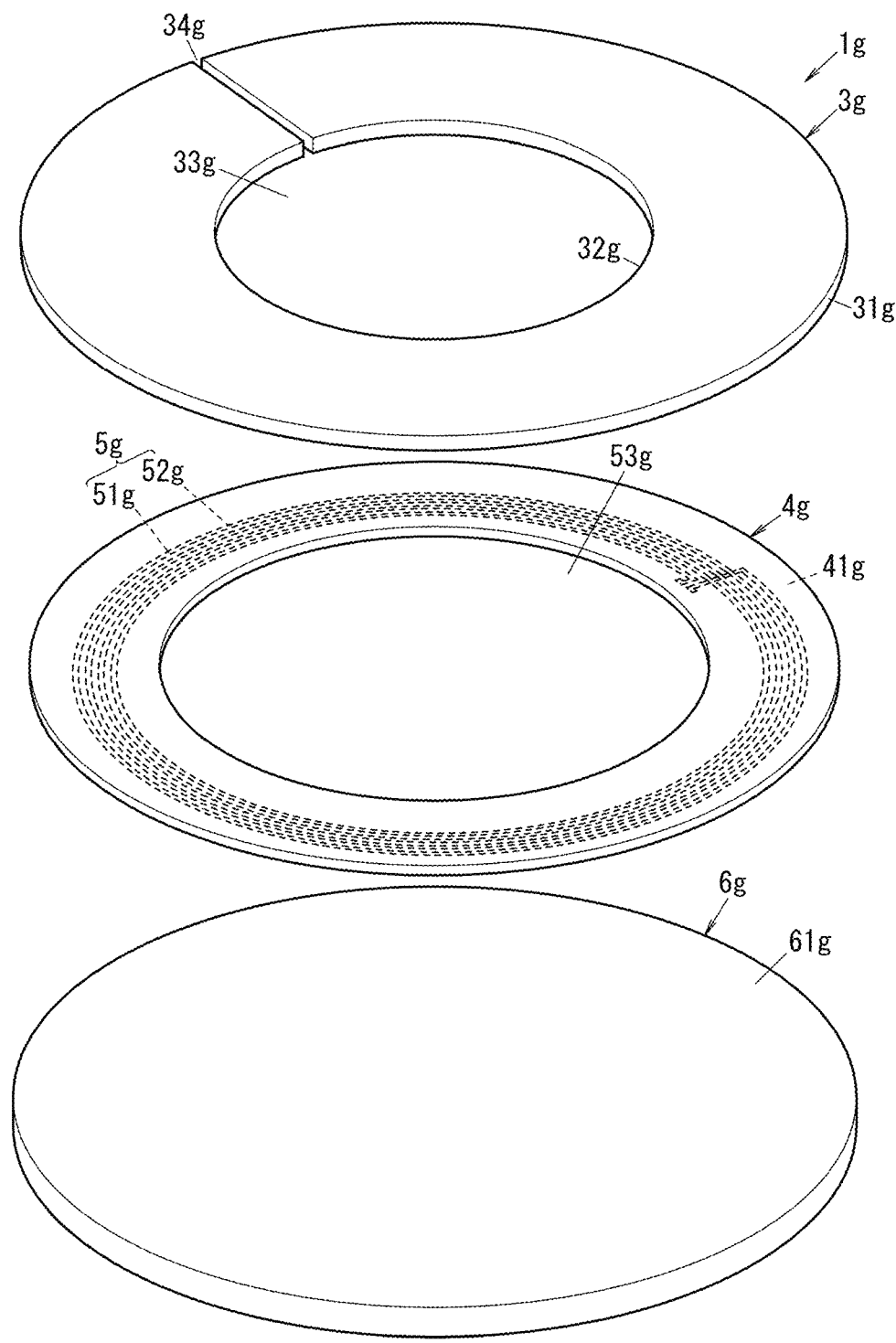
FIG. 19 is an exploded perspective view of the antenna device.

As illustrated in FIGS. 18A, 18B, and FIG. 19, the antenna device 1g according to the Preferred Embodiment 5 includes an antenna element 2g and a planar conductor 3g. As in the case of the planar conductor 3e according to the Preferred Embodiment 4, the planar conductor 3g includes a conductor opening 33g and a slit 34g. Specifically, the planar conductor 3g is the same or substantially the same as the planar conductor 3e according to the Preferred Embodiment 4 and is thus not described.

The antenna element 2g preferably includes a base 4g, a coil conductor 5g, and a magnetic body 6g. The base 4g is the same or substantially the same as the base 4e according to the Preferred Embodiment 4 and is thus not described. The coil conductor 5g is the same or substantially the same as the coil conductor 5e according to the Preferred Embodiment 4 and is thus not described. The coil conductor 5g is disposed on a main surface 41g of the base 4g.

A magnetic body 6g at least partially overlaps with the coil conductor 5g when the planar conductor 3g is viewed in a plan. More specifically, the magnetic body 6g faces the coil conductor 5g. In the Preferred Embodiment 5, the coil conductor 5g is disposed between the planar conductor 3g and the magnetic body 6g in a direction normal to the planar conductor 3g. The direction normal to the planar conductor 3g is a direction perpendicular or substantially perpendicular to the planar conductor 3g.

The magnetic body 6g has a circular plate or circular sheet shape, and includes a first main surface 61g. The magnetic body 6g is preferably made of a ferromagnetic material such as ferrite, for example. For example, the magnetic body 6g is preferably made of a sintered ferrite, amorphous magnetic, or magnetic sheet. Examples of a ferromagnetic material used for the magnetic body 6g include Mn—Zn—Fe ferrite and Ni—Zn—Fe ferrite. The magnetic body 6g has a higher magnetic permeability than the planar conductor 3g and a protective layer (not illustrated).

In the coil conductor 5g and the planar conductor 3g, throughout the entire first coil conductor portion 51g, on the straight line passing through the center of gravity O5 of the coil opening 53g, a first distance A5 between the first coil conductor portion 51g and a first edge 31g of the planar conductor 3g is shorter than a second distance B5 between the first coil conductor portion 51g and a second edge 32g of the planar conductor 3g. The second distance B5 is shorter than a third distance C5 between the center of gravity O5 of the coil opening 53g and the second edge 32g of the planar conductor 3g.

The operation of the antenna device 1g according to the Preferred Embodiment 5 is preferably the same or substantially the same as that of the antenna device 1e according to the Preferred Embodiment 4. Application examples of the antenna device 1g according to the Preferred Embodiment 5 are the same or substantially the same as those of the antenna device 1e according to the Preferred Embodiment 4.

As described above, the antenna device 1g according to the Preferred Embodiment 5 preferably includes the coil conductor 5g between the planar conductor 3g and the magnetic body 6g in a direction normal to the planar conductor 3g. Thus, the coil conductor 5g is able to be located closer to the planar conductor 3g. The antenna device 1g thus allows a larger amount of a magnetic flux caused by current flowing through the coil conductor 5g to pass through the coil opening 53g of the coil conductor 5g using the magnetic body 6g.

Modified Example According to Preferred Embodiment 5

Figure 20:
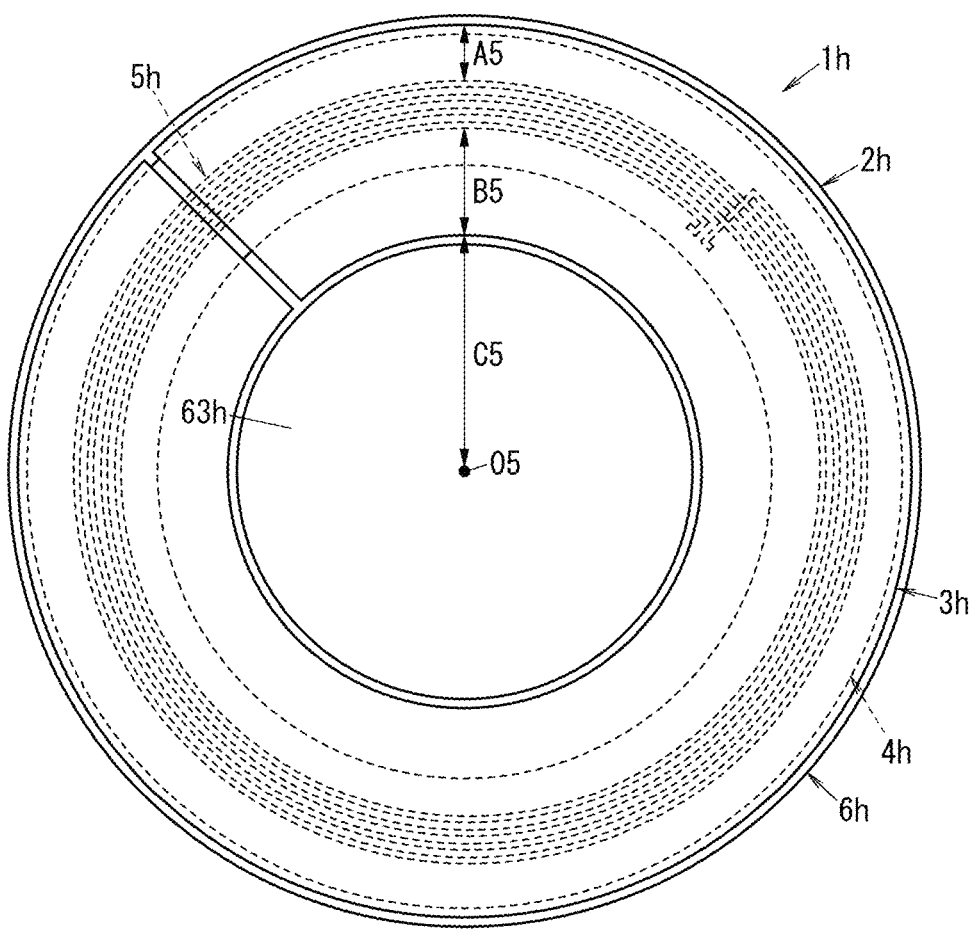
FIG. 20 is a front view of an antenna device according to a modified example of the Preferred Embodiment 5 of the present invention.

An antenna element 2h of an antenna device 1h according to a modified example of the Preferred Embodiment 5 may preferably include, instead of the magnetic body 6g, a magnetic body 6h including a magnetic body opening 63h, as illustrated in FIG. 20. A planar conductor 3h according to the present modified example is preferably the same or substantially the same as the planar conductor 3h according to the Preferred Embodiment 5. A base 4h according to the present modified example is the same or substantially the same as the base 4g according to the Preferred Embodiment 5. A coil conductor 5h according to the present modified example is the same or substantially the same as the coil conductor 5g according to the Preferred Embodiment 5.

The antenna device 1h according to the modified example also has the same or substantially the same advantageous effects as the antenna device 1h according to the Preferred Embodiment 5.

Preferred Embodiment 6

Figure 21:
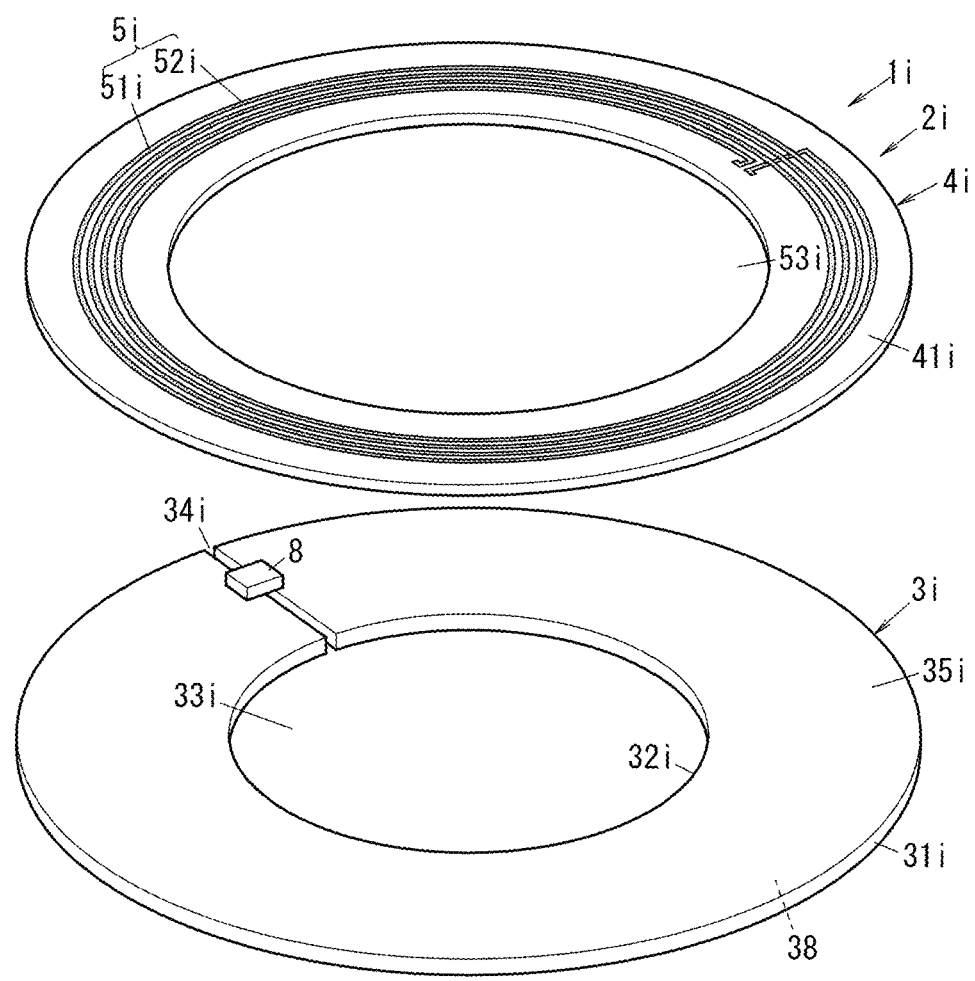
FIG. 21 is an exploded perspective view of an antenna device according to a Preferred Embodiment 6 of the present invention.

An antenna device 1i according to a Preferred Embodiment 6 preferably differs from the antenna device 1 according to the Preferred Embodiment 1 (refer to FIG. 2) in that the antenna device 1i also includes a capacitor 8, as illustrated in FIG. 21. Components of the antenna device 1i according to the Preferred Embodiment 6 the same or substantially the same as those of the antenna device 1 according to the Preferred Embodiment 1 are denoted with the same reference symbols and not described.

As illustrated in FIG. 21, the antenna device 1i according to the Preferred Embodiment 6 includes an antenna element 2i, a planar conductor 3i, and a capacitor 8. The antenna element 2i includes a base 4i and a coil conductor 5i. The capacitor 8 is preferably, for example, a chip capacitor such as a ceramic multilayer capacitor.

The base 4i is preferably a flexible printed circuit board made of a synthetic resin, for example. The base 4i has an annular shape. Components and functions of the base 4i according to the Preferred Embodiment 6 the same or substantially the same as those of the base 4 (refer to FIG. 2) according to the Preferred Embodiment 1 are not described.

The coil conductor 5i is annular and includes a coil opening 53i. The coil conductor 5i is disposed on a main surface 41i of the base 4i. The coil conductor 5i includes a first coil conductor portion 51i and a second coil conductor portion 52i. Components and functions of the coil conductor 5i according to the Preferred Embodiment 6 the same or substantially the same as those of the coil conductor 5 (refer to FIG. 2) according to the Preferred Embodiment 1 are not described.

The planar conductor 3i is annular and includes a conductor opening 33i and a slit 34i. The planar conductor 3i includes a first edge 31i and a second edge 32i, opposing each other. The planar conductor 3i includes a main surface 35i and a main surface 38, and at least partially overlaps with the antenna element 2i when viewed in a plan in the first direction D1. Components and functions of the planar conductor 3i according to the Preferred Embodiment 6 the same or substantially the same as those of the planar conductor 3 (refer to FIG. 2) according to the Preferred Embodiment 1 are not described.

The capacitor 8 is disposed on the planar conductor 3i. More specifically, the capacitor 8 preferably extends across the slit 34i of the planar conductor 3i. Specifically, terminals of the capacitor 8 are electrically connected to portions of the planar conductor 3i at or around the boundary with the slit 34i. The capacitor 8 is disposed in or substantially in the middle between the first edge 31i and the second edge 32i in the radial direction of the planar conductor 3i.

When installed in the planar conductor 3i, the capacitor 8 defines a resonance circuit together with an inductance component of the planar conductor 3i. The resonant frequency of the resonance circuit falls within the communication frequency band. In other words, the capacitance of the capacitor 8 is adjusted to keep the resonant frequency of the resonance circuit within the communication frequency band.

As described above, the antenna device 1i according to the Preferred Embodiment 6 includes the capacitor 8 that extends across the slit 34i of the planar conductor 3i. Thus, the degree of coupling between the planar conductor 3i and an antenna of a communication partner is able to be improved. Thus, the antenna device 1i further improves its communication characteristics.

A capacitor 8 according to a modified example of the Preferred Embodiment 6 may be disposed on the main surface 38, instead of the main surface 35i. The antenna device 1i according to the present modified example also has the same or substantially the same advantageous effects as those of the antenna device 1i according to the Preferred Embodiment 6.

The preferred embodiments and the modified examples are some of preferred embodiments and modified examples of the present invention. The preferred embodiments and the modified examples may be changed in various manners in accordance with, for example, designs as long as they achieve the advantageous effects of the present invention.

SUMMARY

The preferred embodiments and the modified examples disclose the following features.

An antenna device (1) according to a preferred embodiment of the present invention includes a coil conductor (5) and a planar conductor (3). The coil conductor (5) includes a coil opening (53) and has a spiral shape. The planar conductor (3) includes a first edge (31) and a second edge (32). When the planar conductor (3) is viewed in a plan, the planar conductor (3) has the first edge (31) located on the outer side of an outermost turn of the coil conductor (5), and the second edge (32) located in the coil opening (53). The coil conductor (5) includes a first coil conductor portion (51) and a second coil conductor portion (52). The first coil conductor portion (51) faces the planar conductor (3) to at least partially overlap with the planar conductor (3) when the planar conductor (3) is viewed in a plan. The second coil conductor portion (52) does not overlap with the planar conductor (3) when the planar conductor (3) is viewed in a plan. When the planar conductor (3) is viewed in a plan, on a straight line passing through a center of gravity (O1) of the coil opening (53), a first distance (A1) between the first coil conductor portion (51) and the first edge (31) is shorter than a second distance (B1) between the first coil conductor portion (51) and the second edge (32). On the straight line passing the center of gravity (O1) of the coil opening (53), the second distance (B1) is shorter than a third distance (C1) between the center of gravity (O1) of the coil opening (53) and the second edge (32).

In an antenna device (1) according to a preferred embodiment of the present invention, the planar conductor (3) allows current to flow through the second edge (32) in the direction the same as the direction in which current flows through the coil conductor (5). Thus, the planar conductor (3) defines and functions as a booster without reducing the size of the coil opening (53) of the coil conductor (5). The antenna device (1) thus has favorable communication characteristics while having a small size.

In an antenna device (1, 1a) according to a preferred embodiment of the present invention, a planar conductor (3, 3a) includes a conductor opening (33, 33a) and a slit (34, 34a). The conductor opening (33, 33a) is located on an inner side of a second edge (32, 32a) to at least partially overlap with a coil opening (53, 53a) when the planar conductor (3, 3a) is viewed in a plan. The slit (34, 34a) connects the conductor opening (33, 33a) to an area on the outer side of the first edge (31, 31a).

An antenna device (1, 1a) according to a preferred embodiment of the present invention allows current to flow through the second edge (32, 32a) of the planar conductor (3, 3a) in the direction the same as the direction in which current flows through the coil conductor (5, 5a) when the planar conductor (3, 3a) is annular and includes a conductor opening (33, 33a). Thus, the planar conductor (3, 3a) defines and functions as a booster.

An antenna device (1i) according to a preferred embodiment of the present invention also includes a capacitor (8). The capacitor (8) extends across a slit (34i) of the planar conductor (3i).

An antenna device (1i) according to a preferred embodiment of the present invention enhances the degree of coupling between the planar conductor (3i) and an antenna of a communication partner, and thus further improves its communication characteristics.

An antenna device (1e, 1g) according to a preferred embodiment of the present invention also includes a magnetic body (6, 6g). The magnetic body (6, 6g) at least partially overlaps with a planar conductor (3e, 3g) when the planar conductor (3e, 3g) is viewed in a plan.

An antenna device (1e, 1g) according to a preferred embodiment of the present invention allows a magnetic flux caused by current flowing through a second edge of the planar conductor (3e, 3g) to easily pass through a coil opening (53e, 53g) using the magnetic body (6, 6g). The antenna device (1e, 1g) thus enhances the magnetic flux density of the coil opening (53e, 53g).

In an antenna device (1e) according to a preferred embodiment of the present invention, the magnetic body (6) at least partially overlaps with the planar conductor (3e) when the planar conductor (3e) is viewed in a plan. The planar conductor (3e) is disposed between the coil conductor (5e) and the magnetic body (6) in a direction normal to the planar conductor (3e).

An antenna device (1e) according to a preferred embodiment of the present invention allows the magnetic body (6) to be located closer to the planar conductor (3e). Thus, the antenna device (1e) allows a larger amount of a magnetic flux caused by current flowing through the second edge of the planar conductor (3e) to flow through the coil opening (53e) of the coil conductor (5e) using the magnetic body (6).

In an antenna device (1g) according to a preferred embodiment of the present invention, the magnetic body (6g) at least partially overlaps with the coil conductor (5g) when the planar conductor (3g) is viewed in a plan. The coil conductor (5g) is disposed between the planar conductor (3g) and the magnetic body (6g) in a direction normal to the planar conductor (3g).

An antenna device (1g) according to a preferred embodiment of the present invention allows the coil conductor (5g) to be located closer to the planar conductor (3g). Thus, the antenna device (1g) allows a larger amount of a magnetic flux caused by current flowing through the coil conductor (5g) to pass through the coil opening (53g) of the coil conductor (5g) using the magnetic body (6g).

An electronic device (7) according to a preferred embodiment of the present invention includes an antenna device (1) according to a preferred embodiment of the present invention, and a controller (71). The controller (71) controls the antenna device (1).

In an electronic device (7) according to a preferred embodiment of the present invention, the antenna device (1) allows current to flow through the second edge (32) in the planar conductor (3) in the direction the same as the direction in which current flows through the coil conductor (5). Thus, the planar conductor (3) defines and functions as a booster without reducing the size of the coil opening (53) of the coil conductor (5). Thus, the antenna device (1) has favorable communication characteristics while having a small size.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device, comprising:
    a spiral-shaped coil conductor including a coil opening; and
    a planar conductor including a first edge and a second edge, the first edge being located on an outer side of an outermost turn of the coil conductor and the second edge being located in the coil opening when the planar conductor is viewed in a plan view, wherein
    the coil conductor includes:
        a first coil conductor portion that faces the planar conductor to at least partially overlap with the planar conductor when the planar conductor is viewed in the plan view; and
        a second coil conductor portion that does not overlap with the planar conductor when the planar conductor is viewed in the plan view; and
    in another plan view along a straight line passing through a center of gravity of the coil opening, the planar conductor includes a first distance between the first coil conductor portion and the first edge that is shorter than a second distance between the first coil conductor portion and the second edge; and
    on the straight line passing through the center of gravity of the coil opening, the second distance is shorter than a third distance between the center of gravity of the coil opening and the second edge.

2. The antenna device according to claim 1, wherein the planar conductor includes:
    a conductor opening that is located on an inner side of the second edge and at least partially overlaps with the coil opening when the planar conductor is viewed in the plan view; and
    a slit that connects an area on an outer side of the first edge to the conductor opening.

3. The antenna device according to claim 2, further comprising a capacitor that extends across the slit in the planar conductor.

4. The antenna device according to claim 2, wherein the second coil conductor portion extends over the slit when viewed in the plan view.

5. The antenna device according to claim 1, further comprising a magnetic body that at least partially overlaps with the planar conductor when the planar conductor is viewed in the plan view.

6. The antenna device according to claim 5, wherein
    the magnetic body at least partially overlaps with the planar conductor when the planar conductor is viewed in the plan view, and
    the planar conductor is disposed between the coil conductor and the magnetic body in a direction normal to the planar conductor.

7. The antenna device according to claim 6, further comprising a base positioned between the coil conductor and the planar conductor.

8. The antenna device according to claim 5, wherein
    the magnetic body at least partially overlaps with the coil conductor when the planar conductor is viewed in the plan view; and
    the coil conductor is disposed between the planar conductor and the magnetic body in a direction normal to the planar conductor.

9. The antenna device according to claim 8, further comprising a base positioned between the coil conductor and the planar conductor.

10. An electronic device, comprising:
    the antenna device according to claim 1; and
    a controller that controls the antenna device.

11. The antenna device according to claim 1, further comprising a base positioned between the coil conductor and the planar conductor.

12. The antenna device according to claim 11, wherein the base is made of an electrically insulating material.

13. The antenna device according to claim 1, wherein the coil conductor incudes four or more turns which pass about the coil opening.

14. The antenna device according to claim 13, wherein a conductor line width of an inner turn of the coil conductor is smaller than a conductor line width of an outer turn of the coil conductor.

15. The antenna device according to claim 1, wherein the coil conductor and the planar conductor both have square frame shapes when viewed in the plan view.

16. The antenna device according to claim 15, further comprising a flexible printed circuit board positioned between the coil conductor and the planar conductor.

17. The antenna device according to claim 1, wherein the planar conductor is defined by a solid rectangular plate.

18. The antenna device according to claim 17, wherein a total area of the second coil conductor portion is greater than a total area of the first coil conductor portion.

19. The antenna device according to claim 1, wherein the planar conductor is defined by a plurality of discontinuous planar conductors spaced apart about a circumference of the coil conductor.

20. The antenna device according to claim 19, wherein each of the plurality of discontinuous planar conductors has a fan or trapezoidal shape.

* * * * *